United States Patent
Miraj et al.

(10) Patent No.: US 12,056,413 B2
(45) Date of Patent: Aug. 6, 2024

(54) CONTEXTUAL WORKFLOW TRIGGERING ON DEVICES

(71) Applicant: Microsoft Technology Licensing, LLC, Redmond, WA (US)

(72) Inventors: Klorida Miraj, Issaquah, WA (US); Bernd Ingo Plontsch, Berlin (DE); Shrey Shah, Redmond, WA (US); Viktoryia Akulich, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/033,399

(22) Filed: Sep. 25, 2020

(65) Prior Publication Data

US 2022/0100453 A1 Mar. 31, 2022

(51) Int. Cl.
*G06F 3/14* (2006.01)
*G06F 3/01* (2006.01)
*G10L 15/22* (2006.01)
*G10L 15/26* (2006.01)

(52) U.S. Cl.
CPC ............ *G06F 3/1423* (2013.01); *G06F 3/011* (2013.01); *G10L 15/22* (2013.01); *G10L 15/26* (2013.01)

(58) Field of Classification Search
CPC ........ G06F 3/1423; G06F 3/011; G10L 15/22; G10L 15/26
See application file for complete search history.

(56) References Cited

U.S. PATENT DOCUMENTS

| | | | |
|---|---|---|---|
| 8,862,474 B2* | 10/2014 | Burke | G10L 15/26 704/270 |
| 9,829,969 B2 | 11/2017 | Yang et al. | |
| 9,857,849 B1 | 1/2018 | Siddiqui et al. | |
| 10,015,442 B1 | 7/2018 | Maltezos et al. | |
| 10,788,934 B2* | 9/2020 | Klein | G09G 5/003 |

(Continued)

FOREIGN PATENT DOCUMENTS

EP 3567456 A1 11/2019

OTHER PUBLICATIONS

Fares, et al., "Effects of Bend Gesture Training on Learnability and Memorability in a Mobile Game", In Proceedings of the ACM International Conference on Interactive Surfaces and Spaces, Oct. 17, 2017, pp. 1-6.

(Continued)

*Primary Examiner* — Sahlu Okebato

(57) ABSTRACT

The unique attributes of handheld devices and how they are used—particularly multi-screen devices—are leveraged to define rules for automatically triggering workflows. By monitoring signals from various device sensors, the device can anticipate a user's intention to perform an action, such as capturing a quick thought. A workflow for performing the action (or actions) may be automatically triggered based on rules for evaluating the sensor signals. By anticipating the user's intentions, the device can automatically perform many of the underlying actions behind the scenes, thereby minimizing the actions performed by the user and improving the user experience. In this way, cumbersome, multi-step user inputs and interactions are avoided by anticipating user intentions and automatically triggering workflows.

20 Claims, 18 Drawing Sheets

(56) References Cited

U.S. PATENT DOCUMENTS

| | | | |
|---|---|---|---|
| 2010/0069123 A1* | 3/2010 | Araradian | G06F 1/1626 |
| | | | 455/566 |
| 2011/0238191 A1* | 9/2011 | Kristjansson | G10L 15/22 |
| | | | 700/94 |
| 2012/0327133 A1* | 12/2012 | Eguchi | G09G 3/3611 |
| | | | 345/690 |
| 2013/0274926 A1* | 10/2013 | Tomimori | G06F 1/16 |
| | | | 700/275 |
| 2015/0227271 A1* | 8/2015 | Kang | G06F 3/0487 |
| | | | 715/781 |
| 2015/0314454 A1 | 11/2015 | Breazeal et al. | |
| 2017/0206863 A1 | 7/2017 | An et al. | |
| 2018/0032980 A1* | 2/2018 | Rodriguez | G06Q 20/102 |
| 2018/0329508 A1 | 11/2018 | Klein et al. | |
| 2020/0053651 A1 | 2/2020 | Lee et al. | |
| 2020/0073443 A1 | 3/2020 | Seo et al. | |
| 2022/0382503 A1* | 12/2022 | Kwon | G06F 3/04886 |

OTHER PUBLICATIONS

Nagaraju, Samudrala, "Swift Gestures: Seamless Bend Gestures Using Graphics Framework Capabilities", In Proceedings of International Conference on Human-Computer Interaction, Jul. 21, 2015, pp. 118-129.

"International Search Report and Written Opinion Issued in PCT Application No. PCT/US21/036069", Mailed Date: Dec. 13, 2021, 23 Pages.

* cited by examiner

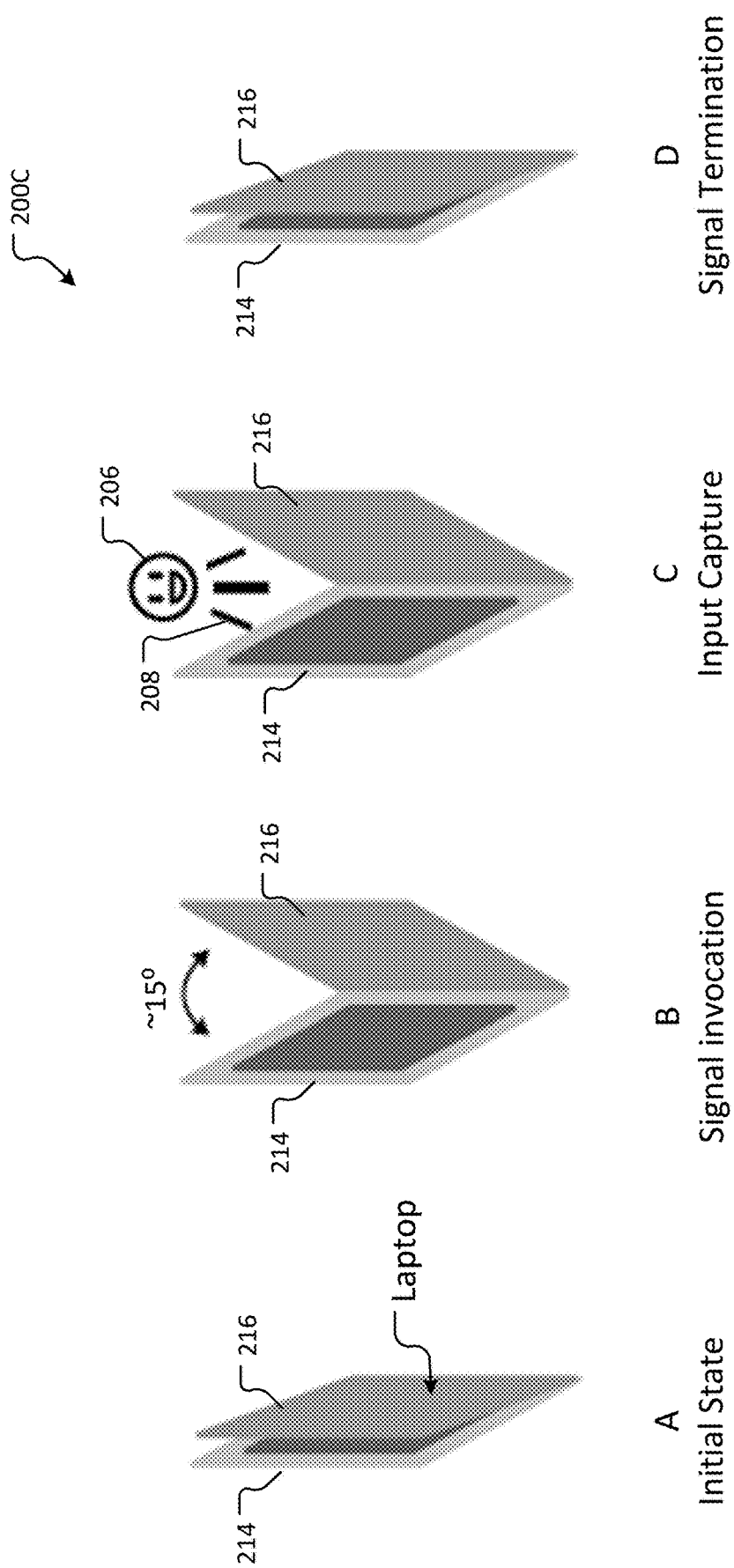

CONTEXTUAL WORKFLOW TRIGGERING ON DEVICES

BACKGROUND

Handheld devices, including those with dual or multiple screens, are broadly available and serve not only as mobile phones but as cameras, video recorders, notepads, personal assistants, calendar and task managers, and more. However, user interactions with such devices are not well defined and often require multiple steps to access a desired application to perform an action. That is, the devices are unable to evaluate user interactions, device states, and context in order to automatically launch a desired application to perform a desired action. As a result, users are required to provide multiple inputs (e.g., taps, clicks, touches) to navigate to a particular screen, find and open the desired application, navigate within the application to find and select the desired action, and then, finally, perform the desired action. Such multiple steps and inputs are not only frustrating to users but may often dissuade users from using handheld devices for simple tasks, such as jotting down notes or reminders. Thus, while handheld devices are readily accessible to users and are both capable and uniquely suited to perform quick actions, the present cumbersome implementation undermines the "quickness" of such actions.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

In order to address the issues identified above, the present methods and systems leverage the unique attributes of handheld devices and how they are used—particularly multi-screen devices—to define rules for automatically triggering workflows. A "workflow" may be defined as a sequence of device state transitions for providing a user experience. For example, it may be determined that the unique attributes of dual-screen devices offer users the natural ability to capture quick thoughts by performing intuitive motions such as minimally opening the device, speaking (or whispering) a short input into the private space between the screens, and then closing the device when finished. By monitoring signals from various device sensors, the device can anticipate a user's intention to perform an action, such as capturing a quick thought. A workflow for performing the action (or actions) may be automatically triggered based on rules for evaluating the sensor signals. By anticipating the user's intention to capture the quick thought, the device can automatically perform many of the underlying actions behind the scenes, thereby minimizing the actions performed by the user and improving the user experience. Thus, the present systems and methods avoid cumbersome, multi-step user inputs and interactions by anticipating user intentions and automatically triggering workflows. The workflows described herein allow users to intuitively interact with handheld devices, such as multi-screen devices, to perform intended actions. Moreover, by reducing the user inputs required to interact with handheld devices, the unique attributes and capabilities of such devices are leveraged to free users from the cognitive and computations load associated with performing the intended actions.

In aspects, a computer-implemented method for triggering at least one workflow on a handheld device is provided. The method includes receiving at least a first signal, where the first signal is indicative of at least one of: a device orientation, a device position, a device state, an angle between device components, or a proximity of a user, and evaluating the first signal based on a ruleset associated with triggering a first workflow for providing a user experience. Based on the evaluation, the method further includes automatically triggering a first device state transition for providing at least a first output associated with the first workflow. Additionally, the method includes receiving at least a second signal, where the second signal is indicative of a device interaction, and evaluating the second signal based on the ruleset. Based on the evaluation, the method includes automatically triggering a second device state transition for providing at least a second output associated with the first workflow. The method further includes determining that the first output and the second output provide the user experience and terminating the first workflow.

In further aspects, a handheld device is provided. The handheld device includes at least one processor and at least one memory storing computer-executable instructions that when executed by the at least one processor causes the handheld device to perform operations. The operations include receiving a first signal, where the first signal is indicative of one or more of: a device orientation, a device position, a device state, an angle between device components, or a proximity of a user, and evaluating the first signal based on a ruleset associated with triggering a workflow for providing a user experience. Based on the evaluation, the operations include automatically triggering a first device state transition for providing at least a first output associated with the workflow. Additionally, the operations include receiving at least a second signal, where the second signal is indicative of a user input, and evaluating at least the second signal based on the ruleset. Based on the evaluation, the operations include automatically triggering a second device state transition for providing at least a second output associated with the workflow and determining that the first output and the second output provide the user experience.

In still further aspects, a computer storage medium is provided. The computer storage medium stores computer-executable instructions that when executed by a processor cause a computer system to perform operations. The operations include defining a workflow for providing a user experience on a handheld device and translating the workflow into an advance state machine model, where the advance state machine model includes one or more device state transitions for implementing the workflow. The operations further include defining one or more signals for triggering the one or more device state transitions to implement the workflow and generating a ruleset for evaluating the one or more defined signals to determine whether to trigger the one or more device state transitions. Additionally, the operations include training the ruleset based on at least one of usage data or device parameters.

Any of the one or more above aspects in combination with any other of the one or more aspects. Any of the one or more aspects as described herein.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIGS. 2A-2D depict examples of signals for triggering a contextual workflow on different device types in accordance with aspects of the present disclosure.

DETAILED DESCRIPTION

Figure 1:
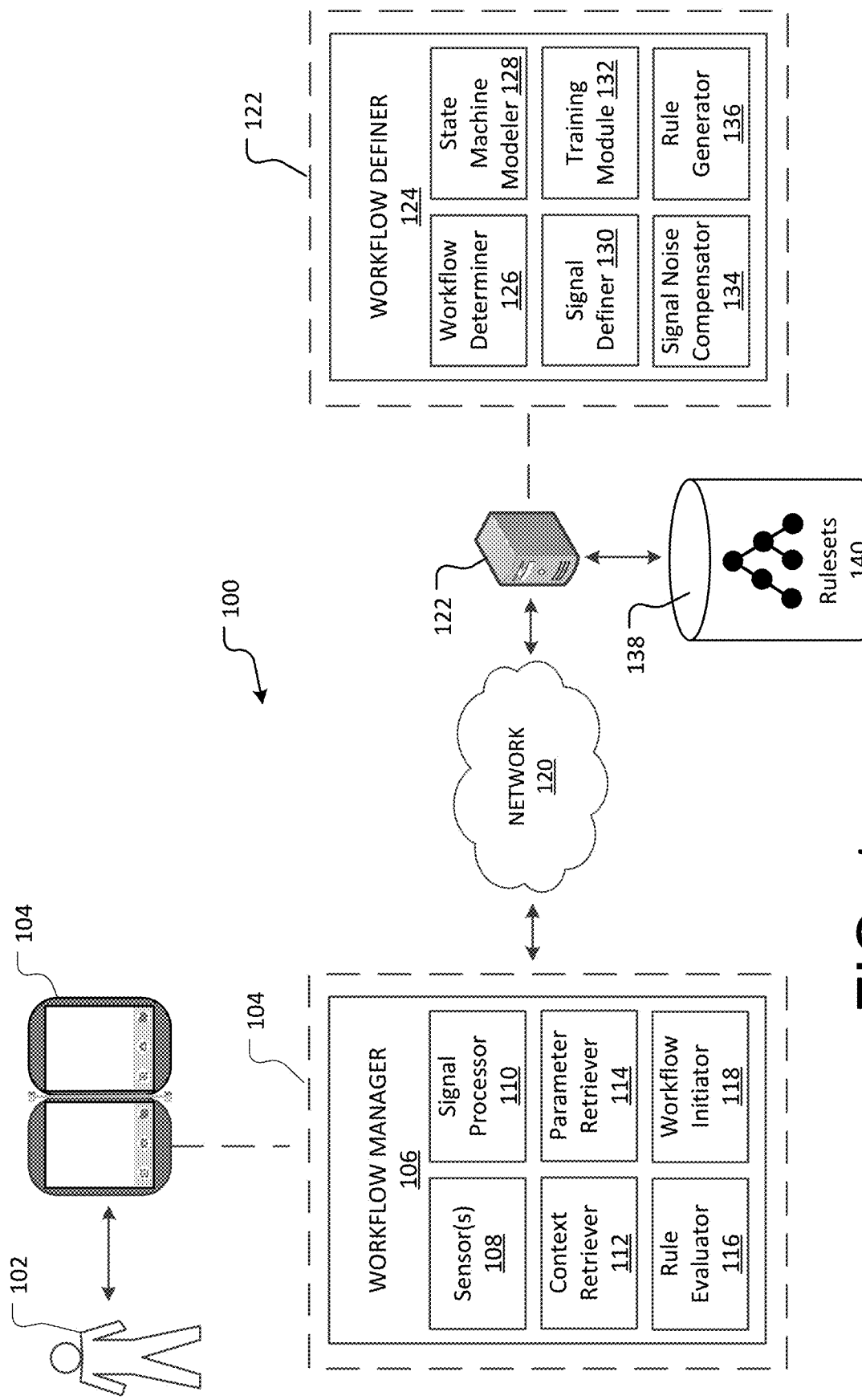
FIG. 1 illustrates an overview of an example system for defining and triggering contextual workflows in accordance with aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

As noted above, handheld devices, including those with dual or multiple screens, are broadly available and serve not only as mobile phones but as cameras, video recorders, notepads, personal assistants, calendar and task managers, and more. However, user interactions with such devices are not well defined and often require multiple steps to access a desired application to perform an action. That is, the devices are unable to evaluate user interactions, device states, and context in order to automatically launch a desired application to perform a desired action. As a result, users are required to provide multiple inputs (e.g., taps, clicks, touches) to navigate to a particular screen, find and open the desired application, navigate within the application to find and select the desired action, and then, finally, perform the desired action.

Multiple steps and inputs are not only frustrating to users but often dissuade users from using handheld devices for simple tasks. For instance, to jot down a quick note or reminder, a user must currently perform seven or more steps, including unlocking the device, navigating on the home screen to locate a notes or tasks application, opening the desired application, navigating within the application to identify an existing note or task (or create a new note or task), launching the keyboard or microphone, typing or speaking the note or reminder, saving the note or reminder, and closing the application and/or locking the device. Thus, while handheld devices are readily and nearly continuously available to users, and are both capable and uniquely suited to perform quick actions, the present cumbersome implementation undermines the "quickness" of these actions. This is particularly unfortunate since these devices are often synchronized with comprehensive calendars and tasks lists for users.

In order to address the issues identified above, the present methods and systems leverage the unique attributes of handheld devices and how they are used—particularly multi-screen devices—to define rules for automatically triggering workflows. A "workflow" may be defined as a sequence of device state transitions for providing a user experience. In aspects, a workflow (or a device state transition of a workflow) may be automatically triggered in response to evaluating one or more signals based on the rules. A "signal" may be defined as output of a device sensor (e.g., a device orientation, a device position, a device state, an angle between device components, a user proximity, etc.), output of an application (e.g., speech-to-text translation application), output of processing (e.g., natural language processing, determinations, calculations), and the like. "Input" is the result of processing signal data associated with a device interaction received or captured by a device sensor (e.g., touch sensor, microphone, camera, etc.).

The set of supported sensors may vary across handheld devices, but device sensors may include one or more of: a touch sensor (e.g., resistive, capacitive, acoustic wave, infrared touch sensors) for detecting touch input; a gyroscope for detecting velocity or rotation of device orientation; an accelerometer for detecting a spatial orientation of a device; a proximity (or light) sensor for detecting a user proximity to a device; a microphone for detecting and/or capturing audio input; a camera for capturing image or video input and for detecting a visual field of a device; an angular position sensor (e.g., located at a device hinge) for detecting an angle between screens or between a screen and another device component, an accessory, or a user anatomy (e.g., laptop keyboard, device cover, removable tablet keyboard, user hand, and the like); and the like. Sensors may also include "virtual" or "computed" sensors. In aspects, sensor signals from virtual or computed sensors may involve an interpretation and/or compilation of signals from other sensors. For example, a "hinge" sensor may comprise a virtual implementation based on interpreting other sensors (e.g., a light sensor, gyro sensor, camera sensor) using a machine learning model to emulate a hinge sensor and compute an angle between the screens at the hinge. As should be appreciated, this list of sensors is not exhaustive and should not be understood as limiting; moreover, any number or combination of sensors is contemplated for use by the systems and methods described herein.

The disclosed systems and methods analyze user behavior and/or device parameters to define workflows for improving user experience on handheld devices, such as multi-screen devices. For example, it may be determined that the unique attributes of dual-screen devices offer users the natural ability to capture notes or reminders by performing intuitive motions such as minimally opening the device, speaking (or whispering) a short input into the private space between the screens, and then closing the device when finished. By monitoring signals from various device sensors, the device may anticipate a user's intention to perform an action (or actions), such as capture a quick thought. A workflow for performing the action (or actions) may be automatically triggered based on evaluating the sensor signals by applying a ruleset. Thus, by anticipating the user's intention to capture a note or reminder, the device can automatically perform many of the underlying actions behind the scenes, thereby minimizing the actions performed by the user and improving the user experience.

The workflow for implementing the above scenario may be defined based on a series of device actions, such as detecting the device opening to a minimal screen-to-screen angle, detecting input, capturing input, retrieving context, analyzing the input (and the context), determining and opening an appropriate application or application component, adding the input to the appropriate application or application component, saving the input, and generating a notification of successful completion. To execute the workflow, the device actions may be translated into a series of device state transitions triggered by one or more signals. A ruleset for executing the workflow may specify one or more rules for evaluating the signals to trigger each device state transition. For example, rules may be directed to an order or sequence of device state transitions, a signal (or combination of signals) for triggering each device state transition, a sequence and timing of signals for triggering each state transition, criteria for evaluating the signal or combination of signals (e.g., threshold values and/or ranges of values), and the like. As should be understood, the ruleset for each workflow is extensible, to allow for different signals or combinations of signals to trigger a particular device state transition (e.g., for devices with a different set of supported sensors), or to allow for the same signals or combinations of signals to trigger different device state transitions on different devices or in different contexts. As used herein, "context" may broadly refer to additional information relevant to a user intent with respect to a workflow, such as frequently used applications, application data (e.g., meetings scheduled in a calendar application or existing tasks such as a grocery list), user behavior, user preferences, installed applications, application settings, and the like.

As should be further appreciated, while a workflow for capturing a quick thought is used herein as a sample embodiment of the methods and systems described, the disclosure is not so limited. That is, additional workflows may be created and triggered to provide different user experiences. For instance, a workflow to accept voice commands from a closed state may be provided. In this example, a fingerprint sensor may detect a double tap while a dual-screen device is closed (e.g., first and second screens are adjacent at an angle of about 0 degrees). Additionally, a gyroscope and/or an accelerometer may detect that the dual-screen device has been placed in an upright position. By evaluating the sensor signals based on a ruleset, it may be determined that the workflow for accepting voice commands should be triggered, and, in particular, a device state transition should be triggered for lighting up a microphone to listen for audio input. In response to detecting the audio input, the microphone may capture the audio input as signal data. Unlike the workflow for capturing a quick thought, the workflow for accepting voice commands may involve device state transitions for evaluating the audio input to detect a command, evaluating the command to identify an operation to be performed, and, in some cases, performing the operation.

In another example, a workflow for launching a "camera first" application may be provided. Here, a gyroscope and/or an accelerometer may detect that the dual-screen device has been placed in tent posture, and an angular position sensor may detect that the screens are oriented at an angle of about 280 degrees with respect to each other. Additionally, a proximity sensor (or a touch sensor) may detect that one screen is in contact with a flat surface (e.g., a table). In this case, the dual-screen device is in a static position (not requiring the user to hold the device) and one screen (e.g., the first screen) is oriented such that the user may view content on the first screen and/or a camera associated with the first screen may capture an image or video. By evaluating the sensor signals based on a ruleset, it may be determined that the workflow for launching a "camera first" application should be triggered. Upon retrieving and evaluating context (e.g., a user's calendar), it may be determined that a video call is scheduled. In this case, a device state transition may be triggered for launching a particular "camera first" application associated with the scheduled video call, such as Microsoft Teams®, Cisco WebEx®, or Zoom®. As should be appreciated any number of workflows may be defined for improving user experience by anticipating a user intention and minimizing actions performed by the user to implement the user intention.

The output(s) of a workflow (or a device state transition), e.g., the user experience, may involve performing one or more "actions," including operations such as "light up," "open," "capture," "save," "connect," "disconnect," "project," "wait for input," and the like. For instance, the workflow for capturing a note or reminder may involve a number of actions performed by the device, including detecting a device opening to an angle between screens (or a screen and another device component or a user anatomy) (e.g., about 15 degrees), waiting for input, capturing spoken input, translating the spoken input to text, retrieving context, analyzing the input (and context), determining and opening an appropriate application (e.g., notes app vs. tasks app) and/or an appropriate component of the application (e.g., new task vs. existing task), adding the input to the application or application component, detecting the device closing such that the screens are adjacent (e.g., about 0 degrees apart), saving the input, closing the application, and providing a notification regarding successful completion. Here, while the workflow involves a number of actions that are automatically performed by the device, the user only needs to perform three actions: opening the device to a minimal angle, speaking into the device, and closing the device. Thus, the present systems and methods avoid cumbersome, multi-step user inputs and interactions by anticipating user intentions and automatically triggering workflows. The workflows described herein allow users to intuitively interact with handheld devices, such as multi-screen devices, to perform intended actions. Moreover, by reducing the user inputs required to interact with handheld devices, the unique attributes and capabilities of such devices can be leveraged to free users from the cognitive and computations load associated with performing the intended actions.

FIG. 1 illustrates an overview of an example system 100 for defining and triggering contextual workflows in accordance with aspects of the present disclosure.

As illustrated in FIG. 1, workflow manager 106 may include various components for triggering and executing workflows for automatically providing user experiences on handheld devices—particularly multi-screen devices. The workflow manager 106 includes sensor(s) 108, a signal processor 110, a context retriever 112, a parameter retriever 114, a rule evaluator 116, a workflow initiator 118, and the like. In aspects, each component may communicate and pass data between the other components. The various components may be implemented using hardware, software, or a combination of hardware and software. In aspects, the various components of workflow manager 106 may be executed by an operating system of a handheld computing device (e.g., handheld device 104). In aspects, handheld device 104 may be a mobile phone, a laptop, a tablet, a multi-screen device, a gaming controller, a wearable, or the like. As used herein, a "multi-screen device" may be a computing device associated with two or more screens communicatively coupled by an electronic connector (e.g., a hinge, a magnetic joint, a malleable material, a wire, and the like). For instance, the multi-screen device may be a portable dual-screen device that is foldable at the electronic connector.

As should be appreciated, a multi-screen device may be held or placed in a number of different orientations by a user. As an example, a dual screen device may be opened such that the first screen is oriented at an angle with respect to the second screen, where the angle may range from 0 degrees (device closed) to about 15 degrees (device slightly opened) to about 180 degrees (device screens opened onto the same plane) to about 280 degrees (device screens opened into tent formation) to about 360 degrees (device screens opened fully and folded back onto each other), and any other angle between 0 and 360 degrees. In aspects, a sensor (e.g., an angular position sensor) located at or near a hinge of the dual screen device may detect an angle between the first and second screens. Similarly, other handheld devices may approximate the screen-to-screen orientations described above. For example, a laptop may be opened such the screen and the keyboard are oriented at an angle with respect to each other. In some aspects, the angles exhibited by a laptop may be limited between 0 and about 120 degrees; whereas in other aspects, the angles may not be so limited (e.g., tablet laptops). Additionally, a tablet device (e.g., Microsoft Surface®, Apple iPad®) may be opened such that the screen and a removable keyboard are oriented at an angle with respect to each other. For a mobile phone protected by a wallet flip case, the flip case may be opened to form an angle with respect to the phone screen. Alternatively, for a mobile phone with an exposed screen, a user's hand can be placed against an edge of the phone screen to form an angle. In yet another aspect, e.g., in a holographic environment, both of the user's hands can be oriented to form an angle with respect to each other. As should be appreciated, suitable sensors for detecting angles between a device screen and another device component (e.g., keyboard, device cover), a device screen and a user's hand, and/or both of the user's hands may be integrated or otherwise utilized.

In aspects, the workflow manager 106 may be configured to receive one or more signals from sensor(s) 108 and may process the signals to detect values (e.g., an angle), device positional changes (e.g., changes in orientation, rotation), device interactions (e.g., user proximity, touch input, audio input), and the like. Workflow manager 106 may further retrieve a context (e.g., frequently used applications, application data, user behavior, user preferences, installed applications, application settings, and the like) and/or device parameters (e.g., supported sensors, device usage data, device settings, device form factor, and the like). Based on the context and/or device parameters, the workflow manager 106 may evaluate the processed signal(s) based on a ruleset corresponding to a workflow and may determine whether to initiate (or trigger) the workflow (or a device state transition of the workflow).

As detailed above, workflow manager 106 may include sensor(s) 108. Sensors 108 may include one or more of: a touch sensor (e.g., resistive, capacitive, acoustic wave, infrared touch sensors) for detecting touch input; a gyroscope for detecting velocity or rotation of device orientation; an accelerometer for detecting a spatial orientation of a device; a proximity (or light) sensor for detecting a user proximity to a device; a microphone for capturing audio input; a camera for capturing image or video input and for detecting a visual field of a device; an angular position sensor (e.g., located at a device hinge) for detecting an angle between screens or between a screen and another device component, an accessory, or a user anatomy (e.g., laptop keyboard, device cover, removable tablet keyboard, user hand, etc.); and the like. As should be appreciated, this list of sensors is not exhaustive and should not be understood as limiting; moreover, any number or combination of sensors is contemplated for use by the systems and methods described herein. As should be further appreciated, different handheld devices may support different sensors or sensor configurations. Such device-specific sensor information may be retrieved by the parameter retriever 114.

Workflow manager 106 may also include signal processor 110. Signal processor 110 is configured to receive signal data from the sensor(s) 108 and process the signal data to detect values (e.g., an angle, a camera visual field), device positional changes (e.g., changes in orientation, rotation), device interactions (e.g., user proximity, touch input, audio input), and the like. Based on the example above, signal processor 110 may receive signal data from one or more sensors 108. For instance, a gyroscope may transmit signal data regarding a velocity of a change in orientation or rotation of a device, an accelerometer may transmit signal data regarding an orientation of the device, an angular position sensor may transmit signal data regarding an angle between screens, and a proximity sensor may transmit signal data regarding a user proximity to the device. As should be appreciated, more or fewer sensors may transmit signal data to the signal processor 110. In this example, the single processor 110 may process the signal data from the gyroscope and/or the accelerometer to detect that the device has been raised to a substantially upright position and the screens have been spread apart. The signal processor 110 may further process the signal data from the angular position sensor to detect an angle between the screens of about 15 degrees and may process the signal data from the proximity sensor to detect that the users face has been moved near one or more of the screens.

In some aspects, content retriever 112 may retrieve a context. As noted above, context may broadly refer to information related to a user intention with respect to a workflow, such as frequently used applications, application data (e.g., meetings scheduled in a calendar application or existing tasks such as a grocery list), user behavior, user preferences, installed applications, application settings, and the like. Additionally or alternatively, a parameter retriever 114 may retrieve device-specific parameters such as supported sensors, device usage data (e.g., how users commonly hold or interact with the device), device settings, device form factor (e.g., size, shape, style, layout and position of device components, etc.), and the like.

Rule evaluator 116 evaluates the processed signal data from one or more sensors based on one or more rulesets associated with one or more workflows. As noted above, a ruleset may be created that specifies one or more rules for evaluating signals to determine whether and when to trigger a series of device state transitions associated with a workflow. For example, rules may be directed to an order or sequence of device state transitions, a signal (or combination of signals) for triggering each device state transition, a sequence and timing of signals for triggering each state transition, criteria for evaluating the signal or combination of signals (e.g., threshold values and/or ranges of values), and the like. Additionally, rule evaluator 116 may evaluate context and/or device parameters when applying the ruleset to the signal data. For instance, context including frequently used applications may enable the workflow manager 106 to determine an appropriate application to open (e.g., preferred task application) in response to triggering a device state transition of a workflow. In other aspects, device parameters (e.g., supported sensors) enable the workflow manager 106 to assess signal quality when applying the ruleset. As should be understood, the ruleset for each workflow is extensible, to allow for different signals or combinations of signals to trigger a particular device state transition (e.g., for devices with a different set of supported sensors), or to allow for the same signals or combinations of signals to trigger different device state transitions on different devices or in different contexts.

Based on evaluating signal data based on the ruleset, rule evaluator 116 determines whether a workflow (or a device state transition of a workflow) should be triggered by the operating system. If it is determined that a workflow (or a device state transition of a workflow) should be triggered, workflow initiator 118 interacts with the operating system to trigger the workflow (or the device state transition). Triggering the workflow (or the device state transition) may involve performing one or more actions, including operations such as "light up screen," "open," "capture," "save," "connect," "disconnect," "project," "wait for input," and the like. For instance, based on the example above, rule evaluator 116 may evaluate the processed signals from the sensors, e.g., the orientation of the device, the angle of about 15 degrees between the screens, and/or the proximity of the user's face, based on a ruleset. Upon applying the ruleset to the processed signals, rule evaluator 116 may determine that a workflow for capturing a note or reminder should be triggered and, in particular, a device state transition for lighting up a microphone to listen for audio input should be triggered. In this example, the workflow may progress if and when the microphone (e.g., a sensor 108) detects and captures signal data associated with audio input, the signal processor 110 processes the signal data to obtain the audio input (which may include translating the audio input to text and using natural language processing to evaluate the input). The rule evaluator may then evaluate the input based on the ruleset to determine whether a subsequent device state transition of the workflow should be triggered. In additional or alternative embodiments, rule evaluator 116 may determine whether both a device state transition and another workflow should be triggered by the operating system based on the processed signals. For instance, continuing the example above, the audio input captured via the microphone may comprise both a 'step' (or device state transition) in one workflow (e.g. started by opening a device to a specific angle) and also the starting point of a different workflow (e.g. one that performs processing and results in an independent user experience).

In further aspects, workflow manager 106 my communicate via network 120 with system 122. System 122 may involve one or more servers and system memory (e.g., database 138) for generating rulesets (e.g., rulesets 140) for use by a workflow manager 106 to trigger and execute workflows on handheld devices (e.g., handheld device 104). For instance, system 122 may comprise a workflow definer 124. Workflow definer 124 may comprise a number of modules or components for defining workflows for execution on handheld devices, including workflow determiner 126, state machine modeler 128, signal definer 130, training module 132, signal noise compensator 134 and/or rule generator 136. For instance, workflow determiner 126 may analyze user behavior and/or device characteristics to identify and determine workflows that can be triggered to provide various user experiences. For example, it may be determined that the unique attributes of dual-screen devices offer users the natural ability to capture quick thoughts by performing intuitive motions such as minimally opening the device, speaking (or whispering) a short input into the private space between the screens, and then closing the device when finished. Workflow determiner 126 may determine a workflow for implementing the above scenario based on a series of actions, such as detecting device screens spreading to a minimal angle, detecting input, capturing input, retrieving context, analyzing the input (and the context), determining and opening an appropriate application and/or application component, adding the input to the appropriate application or application component, saving the input, and generating a notification of successful completion.

To implement the workflow on a handheld device, state machine modeler 128 may translate the workflow into a series of device state transitions triggered by one or more signals. Based on user behavior and/or device parameters, signal definer 130 may define one or more signals for triggering device state transitions. For instance, to implement the workflow for capturing a short note or reminder, signal definer 130 may define one or more signals that are indicative of a device being minimally opened, e.g., a signal directed to a minimal angle between the dual screens, and/or that the user is in proximity to at least one screen of the device, e.g., a signal directed to detecting a distance between the user's face and at least one screen. Such signals are indicative of a user's intention to capture a quick note and may be used to trigger a workflow for implementing the user's intention.

Rule generator 136 may define rulesets (e.g., rulesets 140) for evaluating the one or more signals to determine whether a workflow (or a device state transition of a workflow) should be triggered. For instance, a ruleset for a workflow may specify an order or sequence of device state transitions to provide the user experience, specify the signal (or combination of signals) for triggering each state transition, specify criteria for evaluating the signal or combination of signals (e.g., threshold values and/or ranges of values to compensate for signal quality) to determine whether and/or when to trigger, specify an order or sequence of signals to determine whether and/or when to trigger, and the like. As should be understood, the ruleset for each workflow is extensible, to allow for different signals or combinations of signals to trigger a particular device state transition (e.g., for devices with a different set of supported sensors), or to allow the same signals or combinations of signals to trigger different device state transitions on different devices or in different contexts.

Training module 132 may collect training data based on user behavior, device usage data, and/or device parameters to train rulesets. For instance, the training data may evidence variations in user behavior (e.g., left-handed versus right-handed users may pick up, open, and hold handheld devices slightly differently); variations across different devices, such as different sets of supported sensors, different usage data (e.g., users may hold or interact with different devices in different ways), device form factor (e.g., size, shape, style, layout and position of device components, etc.); and the like. That is, the training data may indicate that users pick up and open handheld devices slightly differently, which may influence the criteria for evaluating signals, e.g., for detection of upright orientation, detection of an angle at which a device is minimally opened, detection of proximity between a user and a device, and the like. As should be appreciated, variations in user behavior and/or device parameters can result in variations in signal quality, which can result in inconsistent application of the ruleset when evaluating the signals. Thus, based on the training, noise compensation factors that account for variations in user behavior, device parameters, and the like, can be determined by signal noise compensator 134. The noise compensation factors can then be used by rule generator 136 to update the ruleset 140 with improved criteria (e.g., ranges of values, updated thresholds) for evaluating signals. As should be appreciated, the ruleset may be continually trained and updated to account for new devices, new sensor configurations, evolving user behavior, and the like.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2A:
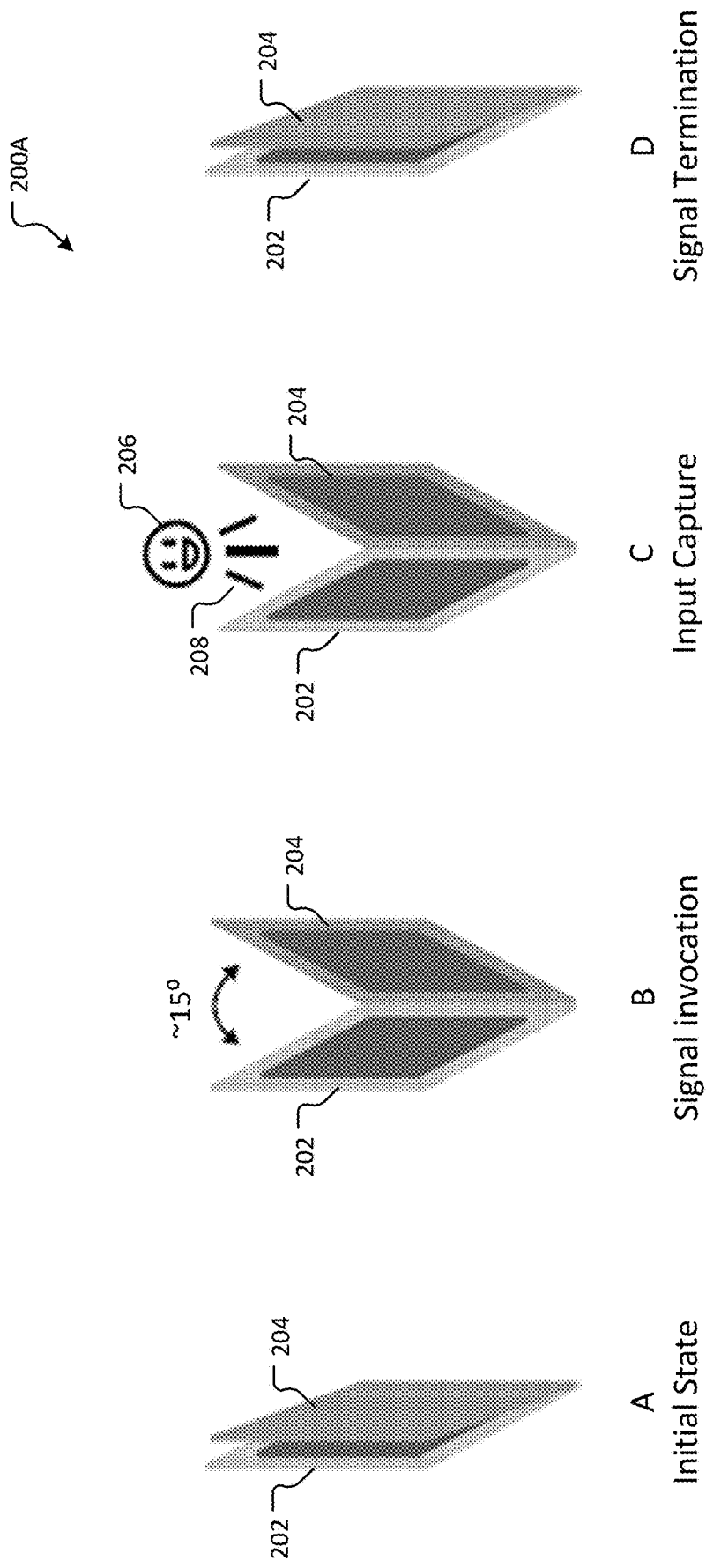

FIGS. 2A-2D depict examples of signals for triggering a contextual workflow on different device types in accordance with aspects of the present disclosure. FIG. 2A depicts an example of signals for triggering a contextual workflow on a dual-screen device in accordance with examples of the present disclosure.

Dual-screen device 200A is one embodiment of a handheld device (e.g., handheld device 104). As noted above, it may be determined that the unique attributes of dual-screen device 200A offers users the natural ability to capture quick thoughts by performing intuitive motions such as minimally opening the device, speaking (or whispering) a short input into the private space between the screens, and then closing the device when finished. A workflow for capturing a quick thought (e.g., a note or reminder) may involve a number of actions performed by the dual-screen device 200A, such as detecting a device opening to an angle between screens (e.g., about 15 degrees), waiting for input, capturing input (e.g., spoken input), detecting the screens against one another (e.g., about 0 degrees), and saving the input. To execute the workflow, the device actions may be translated into a series of device state transitions triggered by one or more signals based on a ruleset.

As illustrated by image A, an initial state of the dual-screen device 200A involves the device being in a closed orientation with first screen 202 and second screen 204 positioned at a screen-to-screen angle of about 0 degrees. As illustrated by image B, the dual-screen device 200A has been opened to a minimal angle (e.g., about 15 degrees). For instance, by processing signal data from one or more sensors (e.g., a gyroscope, an accelerometer, and/or an angular position sensor), it may be determined that the device orientation has changed from a closed state to an open state and the angle between the screens is about 15 degrees. By evaluating the signal(s) based on the ruleset, it may be determined that a workflow for capturing a note or reminder should be triggered and, in particular, a device state transition should be triggered (e.g., signal invocation) for lighting up a microphone to listen for audio input.

As illustrated by image C, a user 206 speaks into the space between first screen 202 and second screen 204 to provide audio input 208 to dual-screen device 200A. In response, the microphone (e.g., a sensor) may detect and capture signal data associated with the audio input 208. Although not illustrated, to analyze the audio input 208, additional device state transitions associated with the workflow may be triggered, e.g., to translate the audio input 208 to text, use natural language processing to analyze the input, determine an application or application component for storing the input, and the like. Audio input 208 may comprise spoken language of variable length. By analyzing audio input 208, it may be determined whether the input is a reminder (e.g., short statement including terms such as "remember to" or "remind me") or a note (e.g., longer statement including terms of reflection or description). It may be further determined that an appropriate application for storing a reminder is a tasks application and an appropriate application for storing a note is a notes application. Additional analysis (e.g., based on context) may indicate that the user frequently uses a particular tasks or notes application and the system may identify a preferred tasks application for storing a reminder or a preferred notes application for storing a note. Based on still further analysis (e.g., based on context), it may be determined that the reminder relates to a grocery item and that a grocery list is an existing task (e.g., application component) associated with the tasks application. In this case, it may be determined that the reminder should be added to the grocery list associated with the tasks application. As should be appreciated, multiple device state transitions may be triggered to analyze the input, determine the appropriate application (or application component) for storing the input, open the appropriate application, and the like.

As illustrated by image D, after providing audio input 208, user 206 may close the dual-screen device 200A. By evaluating signal data from one or more sensors (e.g., a gyroscope, an accelerometer, and/or an angular position sensor), it may be determined that the device orientation has changed from an open state to a closed state and the angle between the screens is reduced to about 0 degrees. By on evaluating the signal(s) based on the ruleset, it may be determined that a device state transition should be triggered for saving the input and the workflow should be terminated (e.g., signal termination). In some cases, before terminating the workflow, additional device state transitions may be triggered for closing the application, generating a notification regarding successful capture and storage of the input to the application, and the like.

Thus, while the workflow involves a number of actions that are automatically performed by the device (e.g., capturing audio input, analyzing the audio input, determining an appropriate application or application component for storing the input, saving the input, and generating a notification), the user only needs to perform three actions: opening the device to a minimal angle (image B), speaking into the space between the screens (image C), and closing the device (image D).

Figure 2B:
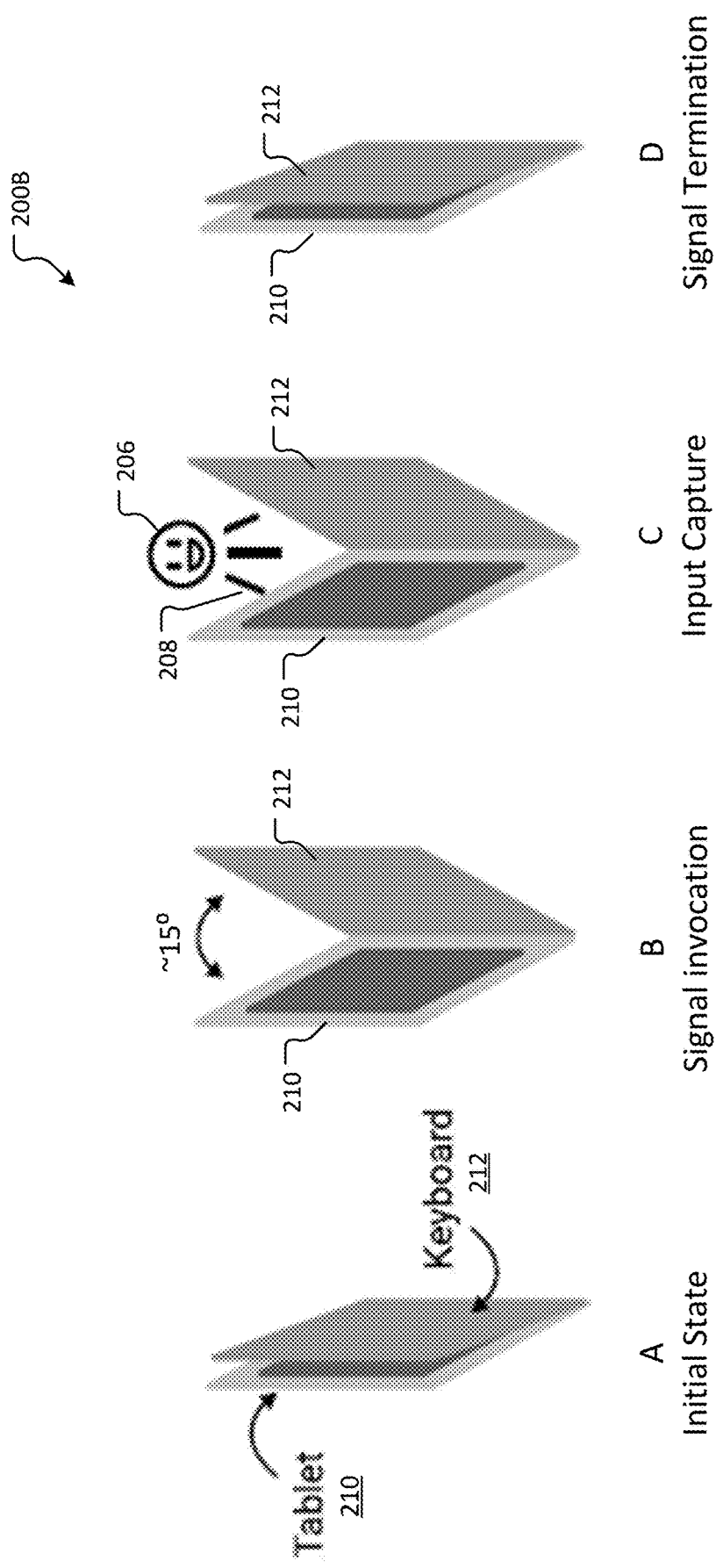

FIG. 2B depicts an example of signals for triggering a contextual workflow on a tablet device associated with a removable keyboard in accordance with examples of the present disclosure.

Tablet device 200B is one embodiment of a handheld device (e.g., handheld device 104). As illustrated, the tablet device 200B is associated with a removable keyboard. Similar to dual-screen device 200A, it may be determined that a tablet device (e.g., tablet device 200B) associated with a removable keyboard offers users the natural ability to capture quick thoughts by performing intuitive motions such as positioning the tablet in a portrait (vertical) orientation, moving the keyboard a minimal distance from the tablet screen, speaking (or whispering) a short input into the private space between the tablet screen and the keyboard, and then moving the keyboard back against the tablet screen when finished. A workflow for capturing a quick thought (e.g., a note or reminder) using tablet device 200B may involve similar device actions as those described for dual-screen device 200A, such as detecting a vertical device orientation, detecting an angle between the tablet screen and keyboard (e.g., about 15 degrees), waiting for input, capturing input (e.g., spoken input), detecting the keyboard against the tablet screen (e.g., about 0 degrees), and saving the input. To execute the workflow, the device actions may be translated into a series of device state transitions triggered by one or more signals base on a ruleset.

As illustrated by image A, an initial state of the tablet device 200B involves the device being in a closed orientation with tablet 210 positioned at an angle of about 0 degrees with respect to keyboard 212. As illustrated by image B, the keyboard 212 of tablet device 200B has been moved a minimal distance from tablet 210, e.g., at an angle of about 15 degrees. For instance, by processing signal data from one or more sensors (e.g., a gyroscope, an accelerometer, and/or an angular position sensor), it may be determined that the device has been positioned in a portrait (or vertical) orientation and the angle between the tablet screen and keyboard is about 15 degrees. By evaluating the signal(s) based on the ruleset, it may be determined that a workflow for capturing a note or reminder should be triggered and, in particular, a device state transition should be triggered (e.g., signal invocation) for lighting up a microphone to listen for audio input.

As illustrated by image C, a user 206 speaks into the space between tablet 210 and keyboard 212 to provide audio input 208 to tablet device 200B. In response, the microphone (e.g., a sensor) may detect and capture signal data associated with the audio input 208. Similar to the discussion above, to analyze the audio input 208, additional device state transitions associated with the workflow may be triggered, e.g., to translate the audio input 208 to text, use natural language processing to analyze the input, determine an application or application component for storing the input, and the like.

As illustrated by image D, after providing audio input 208, user 206 may move keyboard 212 back against tablet 210 when finished. By evaluating signal data from one or more sensors (e.g., a gyroscope, an accelerometer, and/or an angular position sensor), it may be determined that the angle between the tablet 210 and the keyboard 212 is reduced to about 0 degrees. By on evaluating the signal(s) based on the ruleset, it may be determined that a device state transition should be triggered for saving the input and the workflow should be terminated (e.g., signal termination). In some cases, before terminating the workflow, additional device state transitions may be triggered for closing an application, generating a notification regarding successful capture and storage of the input to the application, and the like.

Thus, while the workflow involves a number of actions that are automatically performed by the device (e.g., capturing audio input, analyzing the audio input, determining an appropriate application or application component for storing the input, saving the input, and generating a notification), the user only needs to perform three actions: moving the keyboard away from the tablet at a minimal angle (image B), speaking into the space between the tablet and the keyboard (image C), and moving the keyboard back against the tablet (image D).

FIG. 2C depicts an example of signals for triggering a contextual workflow on a laptop device in accordance with examples of the present disclosure.

Laptop device 200C is one embodiment of a handheld device (e.g., handheld device 104). As illustrated, the laptop device 200C includes a keyboard. Similar to the above handheld devices, it may be determined that laptop device 200C offers users the natural ability to capture quick thoughts by performing intuitive motions such as positioning the laptop in a portrait (vertical) orientation, opening the keyboard a minimal distance from the laptop screen, speaking (or whispering) a short input into the private space between the laptop screen and the keyboard, and then moving the keyboard back against the laptop screen when finished. A workflow for capturing a quick thought (e.g., a note or reminder) using laptop device 200C may involve similar device actions as those described for the devices above, such as detecting a vertical device orientation, detecting an angle between the laptop screen and keyboard (e.g., about 15 degrees), waiting for input, capturing input (e.g., spoken input), detecting the keyboard against the laptop screen (e.g., about 0 degrees), and saving the input. To execute the workflow, the device actions may be translated into a series of device state transitions triggered by one or more signals based on a ruleset.

As illustrated by image A, an initial state of the laptop device 200C involves the device being in a closed orientation with laptop screen 214 positioned at an angle of about 0 degrees with respect to keyboard 216. As illustrated by image B, the keyboard 216 of laptop device 200C has been opened a minimal distance from laptop screen 214, e.g., at an angle of about 15 degrees. For instance, by processing signal data from one or more sensors (e.g., a gyroscope, an accelerometer, and/or an angular position sensor), it may be determined that the device has been positioned in a portrait (or vertical) orientation and the angle between the laptop screen and the keyboard is about 15 degrees. By evaluating the signal(s) based on the ruleset, it may be determined that a workflow for capturing a note or reminder should be triggered and, in particular, a device state transition should be triggered (e.g., signal invocation) for lighting up a microphone to listen for audio input.

As illustrated by image C, a user 206 speaks into the space between laptop screen 214 and keyboard 216 to provide audio input 208 to laptop device 200C. In response, the microphone (e.g., a sensor) may detect and capture signal data associated with the audio input 208. Similar to the discussion above, to analyze the audio input 208, additional device state transitions associated with the workflow may be triggered, e.g., to translate the audio input 208 to text, use natural language processing to analyze the input, determine an application or application component for storing the input, and the like.

As illustrated by image D, after providing audio input 208, user 206 may close keyboard 216 back against laptop screen 214 when finished. By evaluating signal data from one or more sensors (e.g., a gyroscope, an accelerometer, and/or an angular position sensor), it may be determined that the angle between the laptop screen 214 and the keyboard 216 is reduced to about 0 degrees. By on evaluating the signal(s) based on the ruleset, it may be determined that a device state transition should be triggered for saving the input and the workflow should be terminated (e.g., signal termination). In some cases, before terminating the workflow, additional device state transitions may be triggered for closing an application, generating a notification regarding successful capture and storage of the input to the application, and the like.

Thus, while the workflow involves a number of actions that are automatically performed by the device (e.g., capturing audio input, analyzing the audio input, determining an appropriate application or application component for storing the input, saving the input, and generating a notification), the user only needs to perform three actions: opening the keyboard at a minimal angle (image B) from the laptop screen, speaking into the space between the laptop screen and the keyboard (image C), and closing the laptop by moving the keyboard back against the laptop screen (image D).

Figure 2D:
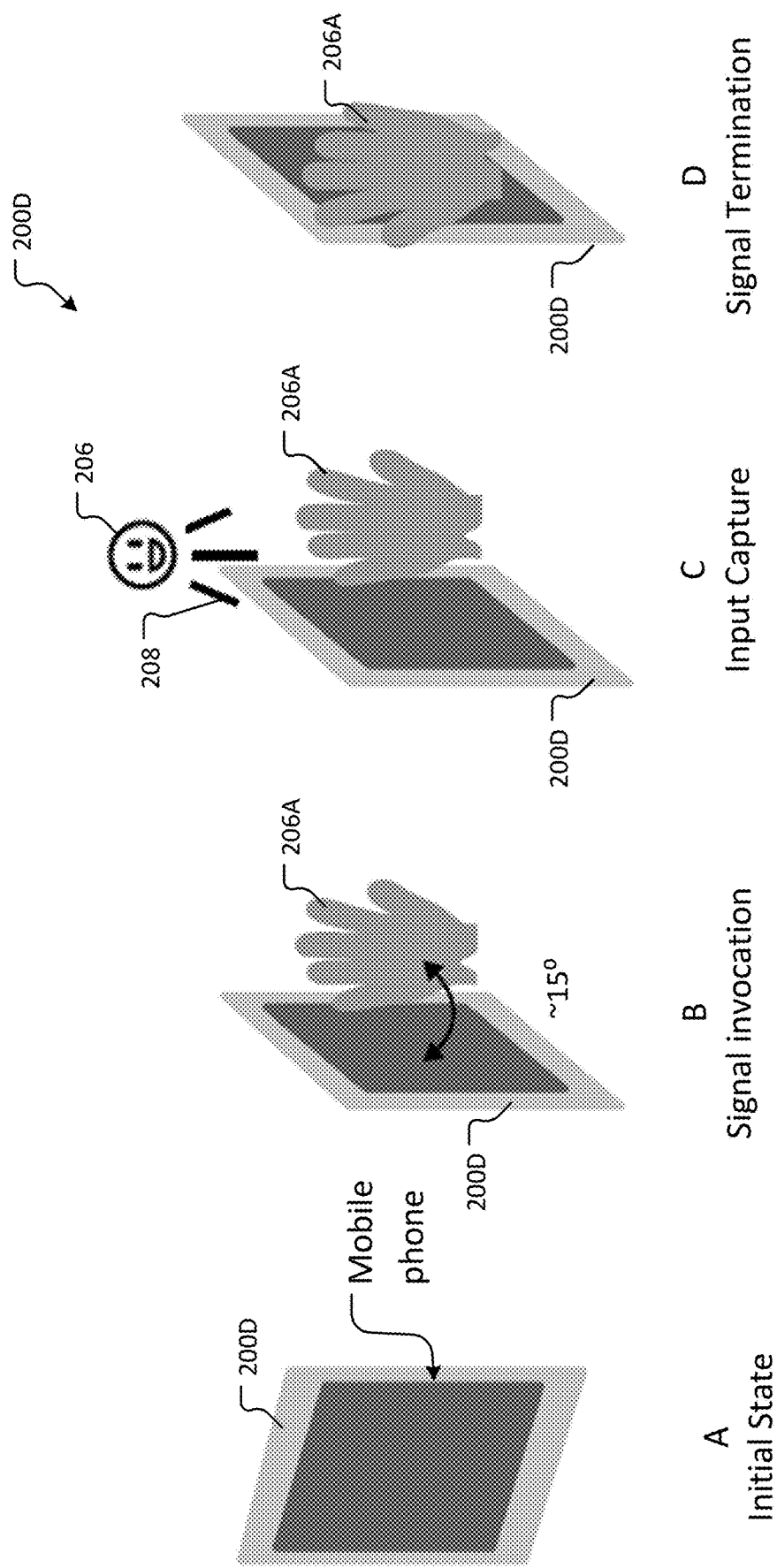

FIG. 2D depicts an example of signals for triggering a contextual workflow on a mobile phone in accordance with examples of the present disclosure.

Mobile phone 200D is one embodiment of a handheld device (e.g., handheld device 104). Similar to the above handheld devices, it may be determined that mobile phone 200D offers users the natural ability to capture quick thoughts by performing intuitive motions such as holding the mobile phone with one hand (e.g., first hand) and positioning the other hand (e.g., second hand) at a minimal angle against a vertical edge of the mobile phone, speaking (or whispering) a short input into the private space between the mobile phone and the second hand, and then placing the second hand over the screen of the mobile phone when finished. A workflow for capturing a quick thought (e.g., a note or reminder) using mobile phone 200D may involve similar device actions as those described for the devices above, such as detecting a vertical device orientation, detecting an angle between the mobile phone and the second hand (e.g., about 15 degrees), waiting for input, capturing input (e.g., spoken input), detecting the second hand placed over the screen of the mobile phone, and saving the input. To execute the workflow, the device actions may be translated into a series of device state transitions triggered by one or more signals based on a ruleset.

As illustrated by image A, an initial state of the mobile phone 200D involves the device being in a resting state. As illustrated by image B, a user's hand 206A has been positioned at a minimal angle against a vertical edge of the mobile phone 200D, e.g., at an angle of about 15 degrees. For instance, by processing signal data from one or more sensors (e.g., a touch sensor, a proximity sensor, and/or an angular position sensor), it may be determined that the user's hand has been positioned against a vertical edge of the mobile phone at an angle of about 15 degrees. By evaluating the signal(s) based on the ruleset, it may be determined that a workflow for capturing a note or reminder should be triggered and, in particular, a device state transition should be triggered (e.g., signal invocation) for lighting up a microphone to listen for audio input.

As illustrated by image C, a user 206 speaks into the space between the mobile phone and the user's hand 206A to provide audio input 208 the mobile phone 200D. In response, the microphone (e.g., a sensor) may detect and capture signal data associated with the audio input 208. Similar to the discussion above, to analyze the audio input 208, additional device state transitions associated with the workflow may be triggered, e.g., to translate the audio input 208 to text, use natural language processing to analyze the input, determine an application or application component for storing the input, and the like.

As illustrated by image D, after providing audio input 208, user 206 may place a hand 206A over the screen of the mobile device when finished. By evaluating signal data from one or more sensors (e.g., a touch sensor, a light sensor, a proximity sensor), it may be determined that the user's hand is positioned over the screen of the mobile device (e.g., touching the screen at numerous locations, blocking light from the screen). By on evaluating the signal(s) based on the ruleset, it may be determined that a device state transition should be triggered for saving the input and the workflow should be terminated (e.g., signal termination). In some cases, before terminating the workflow, additional device state transitions may be triggered for closing an application, generating a notification regarding successful capture and storage of the input to the application, and the like.

Thus, while the workflow involves a number of actions that are automatically performed by the device (e.g., capturing audio input, analyzing the audio input, determining an appropriate application or application component for storing the input, saving the input, and generating a notification), the user only needs to perform three actions: placing a user's hand against an edge of the mobile phone at a minimal angle (image B), speaking into the space between the user's hand and the mobile phone (image C), and placing the user's hand over the screen of the mobile phone (image D).

As should be appreciated, the various methods, devices, interfaces, components, etc., described with respect to FIGS. 2A-2D are not intended to limit the systems and methods to the particular components described. Accordingly, additional topology configurations may be used to practice the methods and systems herein and/or some components described may be excluded without departing from the methods and systems disclosed herein.

Figure 3A:
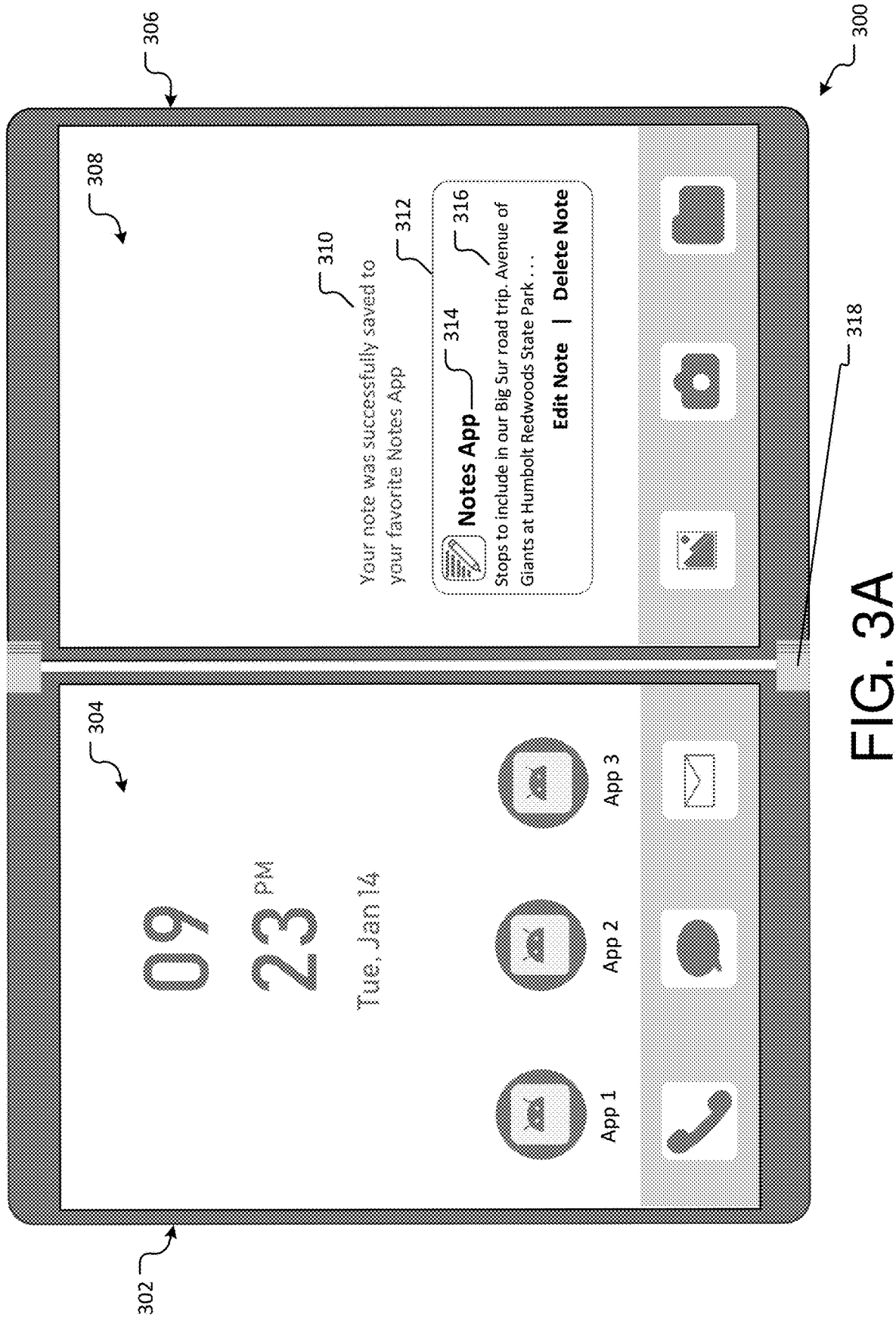
FIGS. 3A-3B depict a first example of one or more outputs of a workflow triggered on a multi-screen device in accordance with examples of the present disclosure.
Figure 3B:
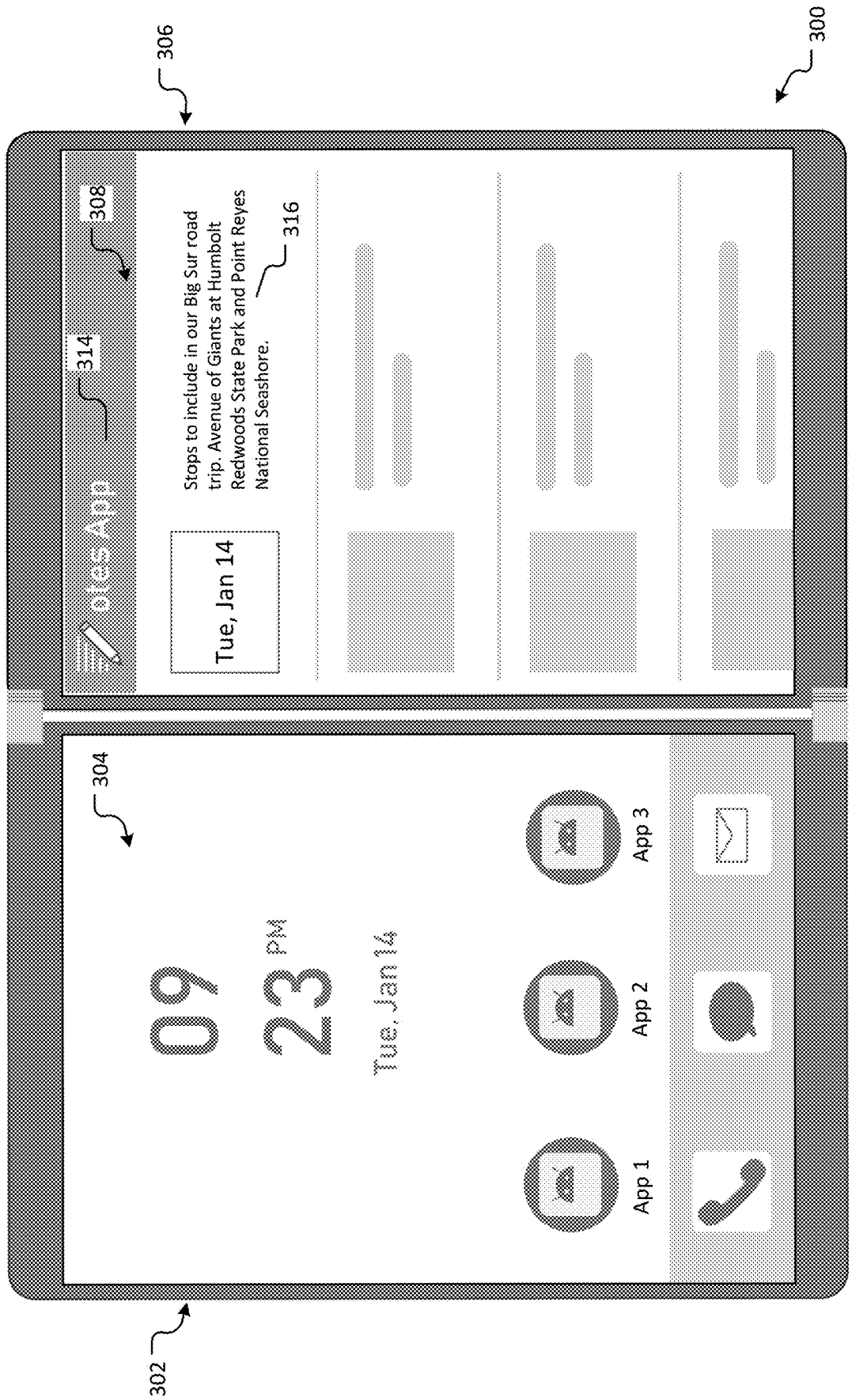

FIGS. 3A-3B depict a first example of one or more outputs of a workflow triggered on a multi-screen device in accordance with examples of the present disclosure.

FIG. 3A illustrates a first view of a dual-screen device 300 displaying outputs (e.g., notifications) resulting from a triggered workflow. Dual-screen device 300 has two screens communicatively coupled by an electronic connector 318 (e.g., a hinge, a magnetic joint, a malleable material, a wire, and the like). In aspects, the electronic connector 318 may be associated with a sensor. As illustrated, dual-screen device 300 includes a first screen 302 having a first display area 304 and a second screen 306 having a second display area 308. In aspects, first screen 302 and second screen 306 may be touch enabled. That is, dual-screen device 300 may receive user input and/or selections via contact with the first screen 302 and the second screen 306, respectively. As illustrated, first display area 304 and second display area 308 are presenting a home screen. The home screen displays the date and time and a number of icons representing user installed applications (e.g., App 1, App 2, App 3) and system applications or features (e.g., a call feature, a text (SMS)

application, a mail application, a photo store, a camera feature, and a folder feature). Second display area 308 further displays notification 310 and notification 312. In aspects, notifications 310 and 312 are outputs of a workflow for capturing a quick thought.

For instance, the workflow for capturing a quick thought may have been triggered based on evaluating processed signals from sensors indicating that the dual-screen device 300 had been opened such that the first screen 302 was oriented at about a 15-degree angle with respect to the second screen 306. Once the workflow was triggered, the dual-screen device 300 may have undergone a series of device state transitions to perform one or more of the following actions: light up a microphone to listen for audio input, detect and capture audio input, retrieve context, analyze the input in view of the context, determine and open an appropriate application (e.g., Notes App 314), add the input to the application, detect closing of the device, save the input to the application, close the application, and provide one or more notifications (e.g., notification 310 and/or notification 312) regarding successful completion. In aspects, notification 310 and/or notification 312 may be displayed to the user when dual-screen device 300 is subsequently opened (as illustrated).

In some aspects, a notification may provide general information regarding successfully capturing a quick thought, as illustrated by notification 310, which provides: "Your note was successfully saved to your favorite Notes App." In other aspects, a notification may provide more detailed information regarding successfully capturing a quick thought, as illustrated by notification 312. For instance, notification 312 displays at least a portion of the captured note 316 (e.g., "Stops to include in our Big Sur road trip. Avenue of Giants at Humbolt Redwoods State Park . . . ") and identifies the particular notes application to which the note 316 was added (e.g., Notes App 314). Additionally, notification 312 may provide one or more controls for editing or deleting the note.

FIG. 3B illustrates a second view of a dual-screen device 300 displaying an output (e.g., saved note) resulting from a triggered workflow.

Similar to FIG. 3A, FIG. 3B illustrates a dual-screen device 300 including a first screen 302 having a first display area 304 and a second screen 306 having a second display area 308. In this case, however, while first display area 304 displays the home screen, second display area 308 displays an open page of Notes App 314. The open page shows a new entry for captured note 316, including a date the note 316 was captured (e.g., Tue, January 14) and the full text of note 316 (e.g., "Stops to include in our Big Sur road trip. Avenue of Giants at Humbolt Redwoods State Park and Point Reyes National Seashore.").

As should be appreciated, the various methods, devices, interfaces, components, etc., described with respect to FIGS. 3A-3B are not intended to limit the systems and methods to the particular components described. Accordingly, additional topology configurations may be used to practice the methods and systems herein and/or some components described may be excluded without departing from the methods and systems disclosed herein.

Figure 4A:
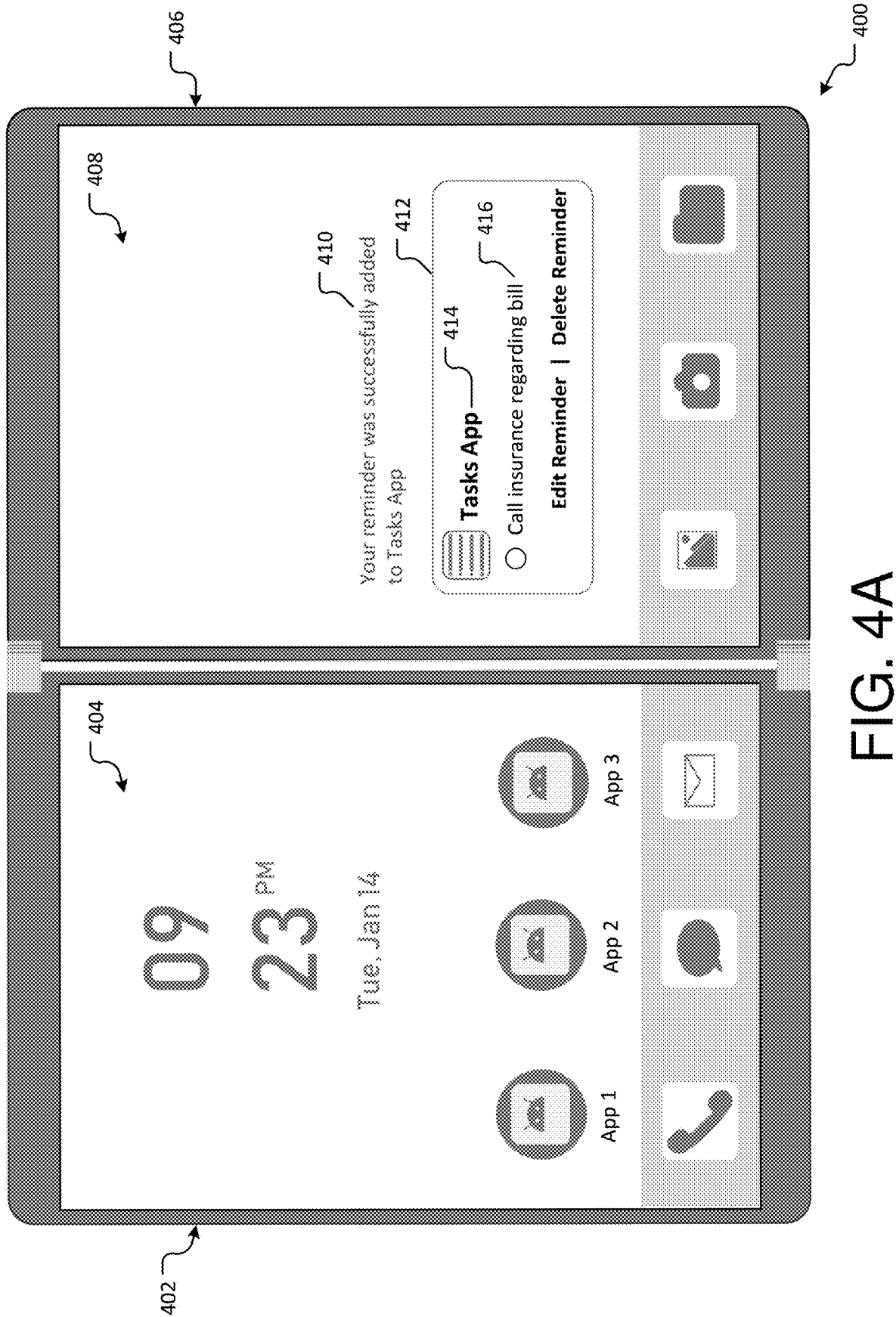
FIGS. 4A-4B depict a second example of one or more outputs of a workflow triggered on a multi-screen device in accordance with examples of the present disclosure.
Figure 4B:
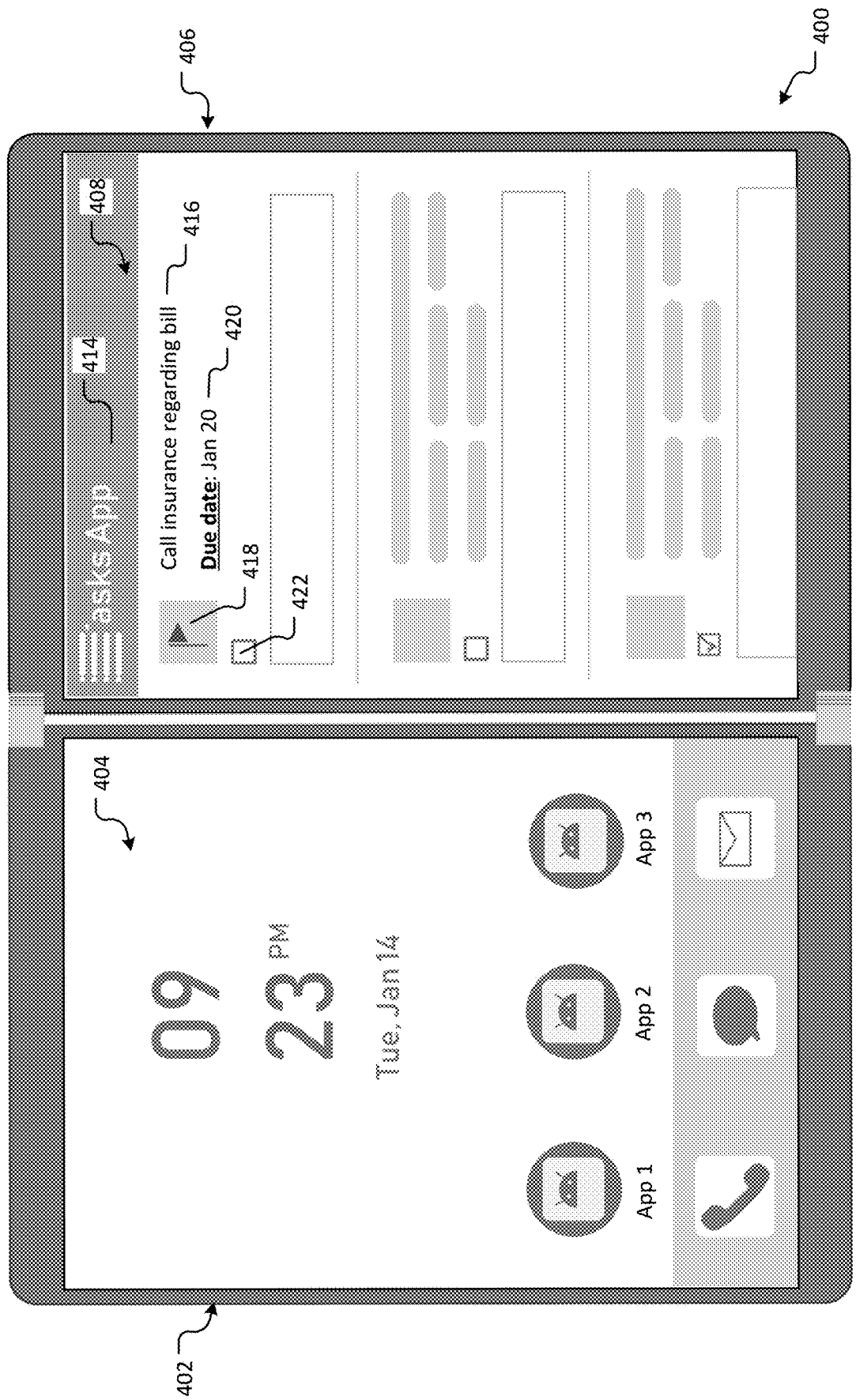

FIGS. 4A-4B depict a second example of one or more outputs of a workflow triggered on a multi-screen device in accordance with examples of the present disclosure.

FIG. 4A illustrates a first view of a dual-screen device 400 displaying outputs (e.g., notifications) resulting from a triggered workflow. As illustrated, dual-screen device 400 includes a first screen 402 having a first display area 404 and a second screen 406 having a second display area 408.

Similar to FIG. 3A, first display area 404 and second display area 408 are presenting a home screen. The home screen displays the date and time and a number of icons representing user installed applications (e.g., App 1, App 2, App 3) and system applications or features (e.g., a call feature, a text (SMS) application, a mail application, a photo store, a camera feature, and a folder feature). Similar to FIG. 3A, second display area 408 further displays notification 410 and notification 412. In aspects, notifications 410 and 412 are outputs of a workflow for capturing a quick thought.

For instance, the workflow for capturing a quick thought may have been triggered based on evaluating processed signals from sensors indicating that the dual-screen device 400 had been opened such that the first screen 402 was oriented at about a 15-degree angle with respect to the second screen 406. Once the workflow was triggered, the dual-screen device 400 may have undergone a series of device state transitions to perform one or more of the following actions: light up a microphone to listen for audio input, detect and capture audio input, retrieve context, analyze the input in view of the context, determine and open an appropriate application (e.g., Tasks App 414), add the input to the application, detect closing of the device, save the input to the application, close the application, and provide one or more notifications (e.g., notification 410 and/or notification 412) regarding successful completion. In aspects, notification 410 and/or notification 412 may be displayed to the user when dual-screen device 400 is subsequently opened (as illustrated).

That is, similar to FIG. 3A, FIG. 4A displays outputs (e.g., notifications) of a workflow for capturing a quick thought. However, in this case, evaluation of the captured input indicated that the input was a reminder rather than a note. Accordingly, the captured input was added to Tasks App 414 (as opposed to Notes App 314). As described above, captured input directed to a reminder may be determined by evaluating input length and/or content using natural language processing. For instance, input directed to a reminder may comprise a short statement including terms such as "remember to" or "remind me." In contrast, input directed to a note may comprise a longer statement including terms of reflection or description, for example.

As described above, a notification may provide general information regarding successfully capturing a quick thought, as illustrated by notification 410, which provides: "Your reminder was successfully saved to Tasks App." In other aspects, a notification may provide more detailed information regarding successfully capturing a quick thought, as illustrated by notification 412. For instance, notification 412 displays the captured reminder 416 (e.g., "Call insurance regarding bill") and identifies the application to which the reminder 416 was added (e.g., Tasks App 414). Additionally, notification 412 may provide one or more controls for editing or deleting the reminder.

FIG. 4B illustrates a second view of a dual-screen device 400 displaying an output (e.g., saved reminder) resulting from a triggered workflow.

Similar to FIG. 4A, FIG. 4B illustrates a dual-screen device 400 including a first screen 402 having a first display area 404 and a second screen 406 having a second display area 408. In this case, however, while first display area 404 displays the home screen, second display area 408 displays an open page of Tasks App 414. The open page shows a new task that has been created for captured reminder 416, including a due date 420 (e.g., January 20), an urgency flag 418, the text of reminder 416 (e.g., "Call insurance regarding bill"), and a completion radio button 422 (not checked).

As should be appreciated, the various methods, devices, interfaces, components, etc., described with respect to FIGS. 4A-4B are not intended to limit the systems and methods to the particular components described. Accordingly, additional topology configurations may be used to practice the methods and systems herein and/or some components described may be excluded without departing from the methods and systems disclosed herein.

Figure 5A:
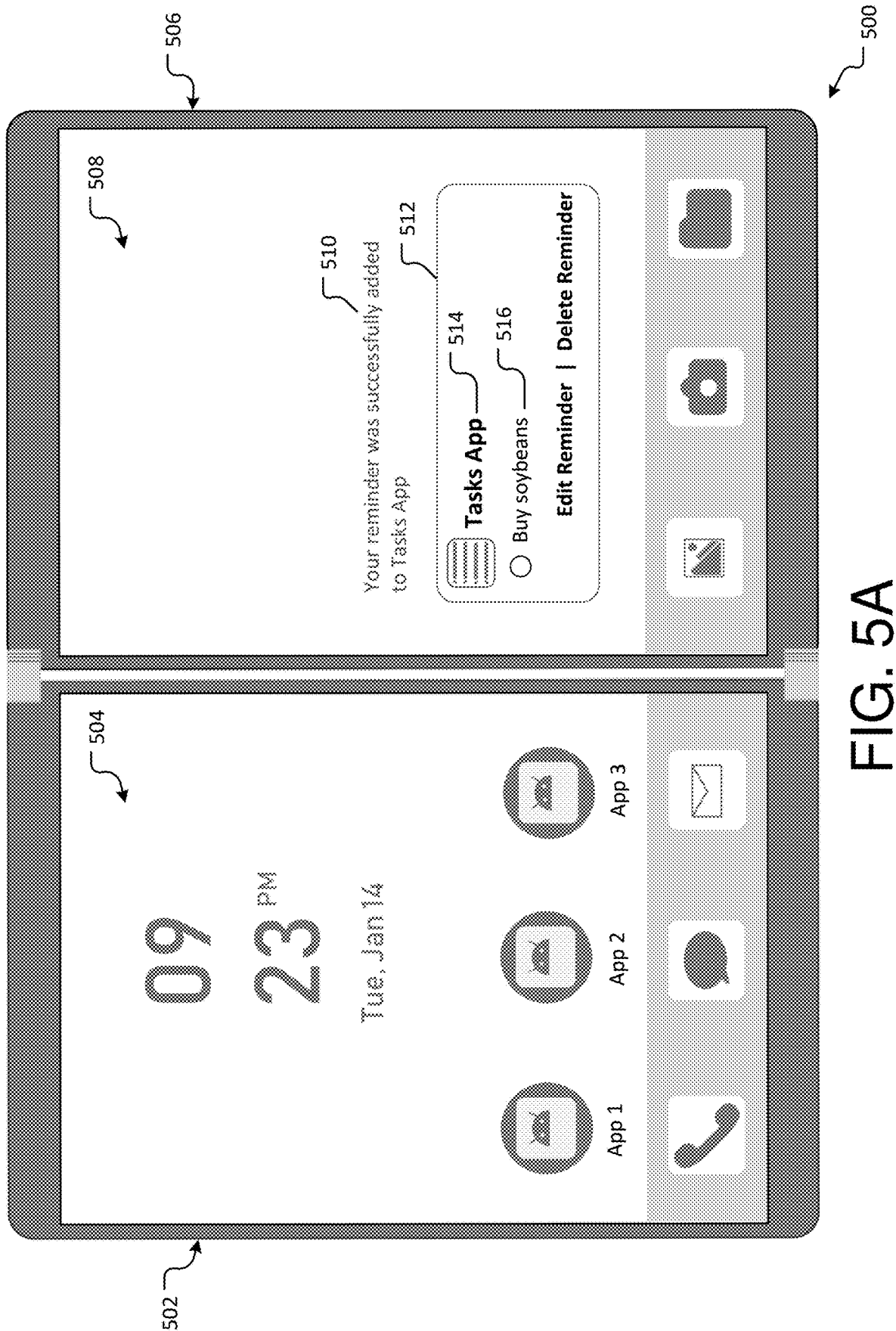
FIGS. 5A-5B depict a third example of one or more outputs of a workflow triggered on a multi-screen device in accordance with examples of the present disclosure.
Figure 5B:
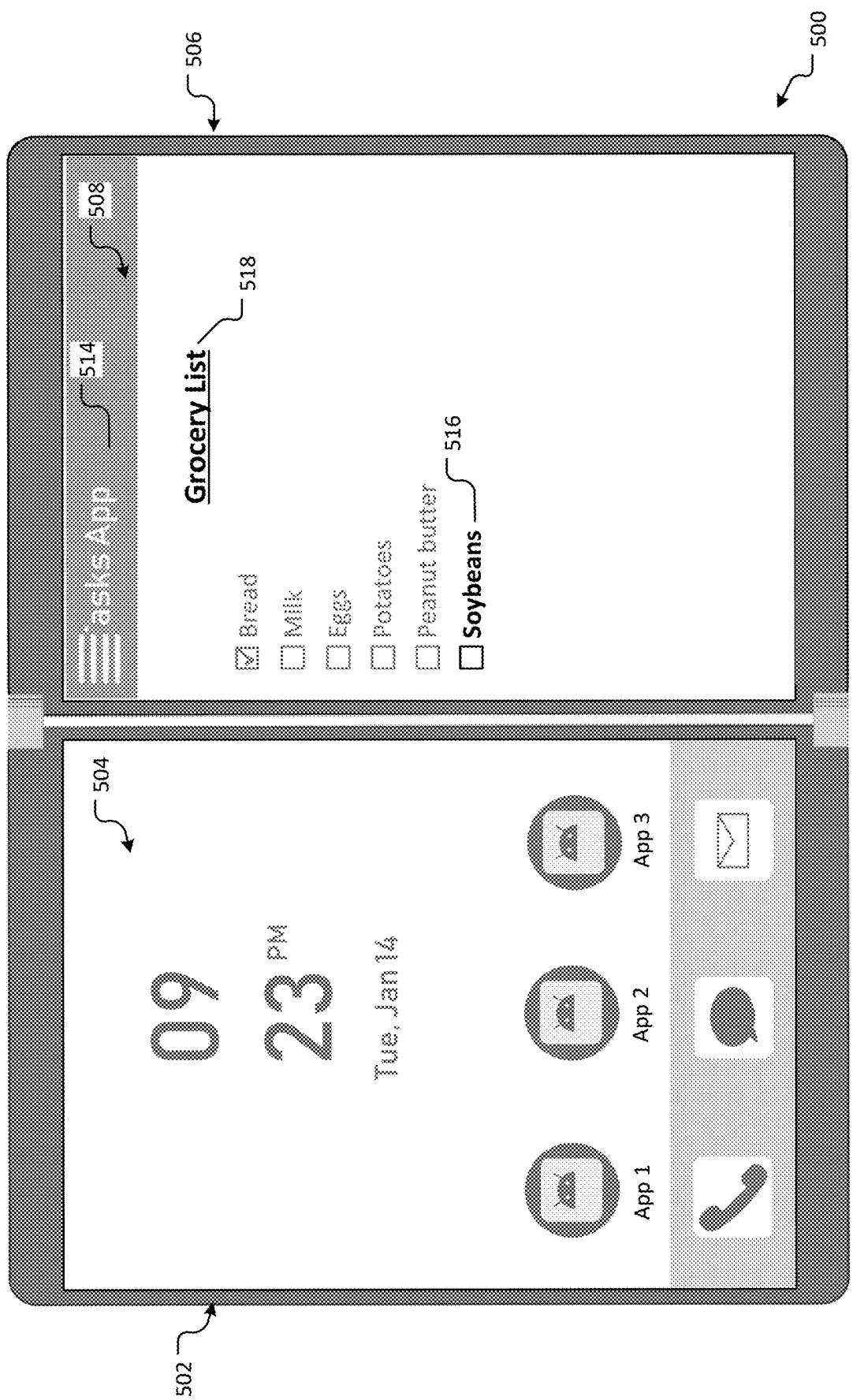

FIGS. 5A-5B depict a third example of one or more outputs of a workflow triggered on a multi-screen device in accordance with examples of the present disclosure.

FIG. 5A illustrates a first view of a dual-screen device 500 displaying outputs (e.g., notifications) resulting from a triggered workflow. Similar to the devices above, dual-screen device 500 includes a first screen 502 having a first display area 504 and a second screen 506 having a second display area 508. Similar to the figures above, first display area 504 and second display area 508 are presenting a home screen. The home screen displays the date and time and a number of icons representing user installed applications (e.g., App 1, App 2, App 3) and system applications or features (e.g., a call feature, a text (SMS) application, a mail application, a photo store, a camera feature, and a folder feature). Similar to the figures above, second display area 408 further displays notification 510 and notification 512. In aspects, notifications 510 and 512 are outputs of a workflow for capturing a quick thought, as described above.

That is, similar to FIG. 4A, FIG. 5A displays outputs (e.g., notifications) of a workflow for capturing a quick thought. As in FIG. 4A, evaluation of the captured input indicated that the input was a reminder. Accordingly, the captured input was added to Tasks App 514. Here, notification 510 provides general information regarding successfully adding the captured reminder, stating: "Your reminder was successfully saved to Tasks App." In contrast, notification 512 provides more detailed information regarding successfully capturing the reminder. For instance, notification 512 displays the captured reminder 516 (e.g., "Buy soybeans") and identifies the application to which the reminder 516 was added (e.g., Tasks App 514). Additionally, notification 512 may provide one or more controls for editing or deleting the reminder.

FIG. 5B illustrates a second view of a dual-screen device 500 displaying an output (e.g., saved reminder) resulting from a triggered workflow.

Similar to FIG. 5A, FIG. 5B illustrates a dual-screen device 500 including a first screen 502 having a first display area 504 and a second screen 506 having a second display area 508. In this case, however, while first display area 504 displays the home screen, second display area 508 displays an open page of Tasks App 514. Unlike FIG. 4B, the open page of Tasks App 514 shows an existing task 516 (e.g., "Grocery List") to which a portion of captured reminder 516 (e.g., "Soybeans") has been added. In this case, in addition to evaluating the input to determine whether the input was directed to a reminder or a note, the input was further evaluated based on context to determine whether the reminder 516 was relevant to an existing task. In this case, it was determined that reminder 516 was directed to buying a grocery item, and that Tasks App 514 had an existing task 518 associated with a grocery list. Accordingly, the reminder 516 was added to the existing task 518.

As should be appreciated, the various methods, devices, interfaces, components, etc., described with respect to FIGS. 5A-5B are not intended to limit the systems and methods to the particular components described. Accordingly, additional topology configurations may be used to practice the methods and systems herein and/or some components described may be excluded without departing from the methods and systems disclosed herein.

Figure 6:
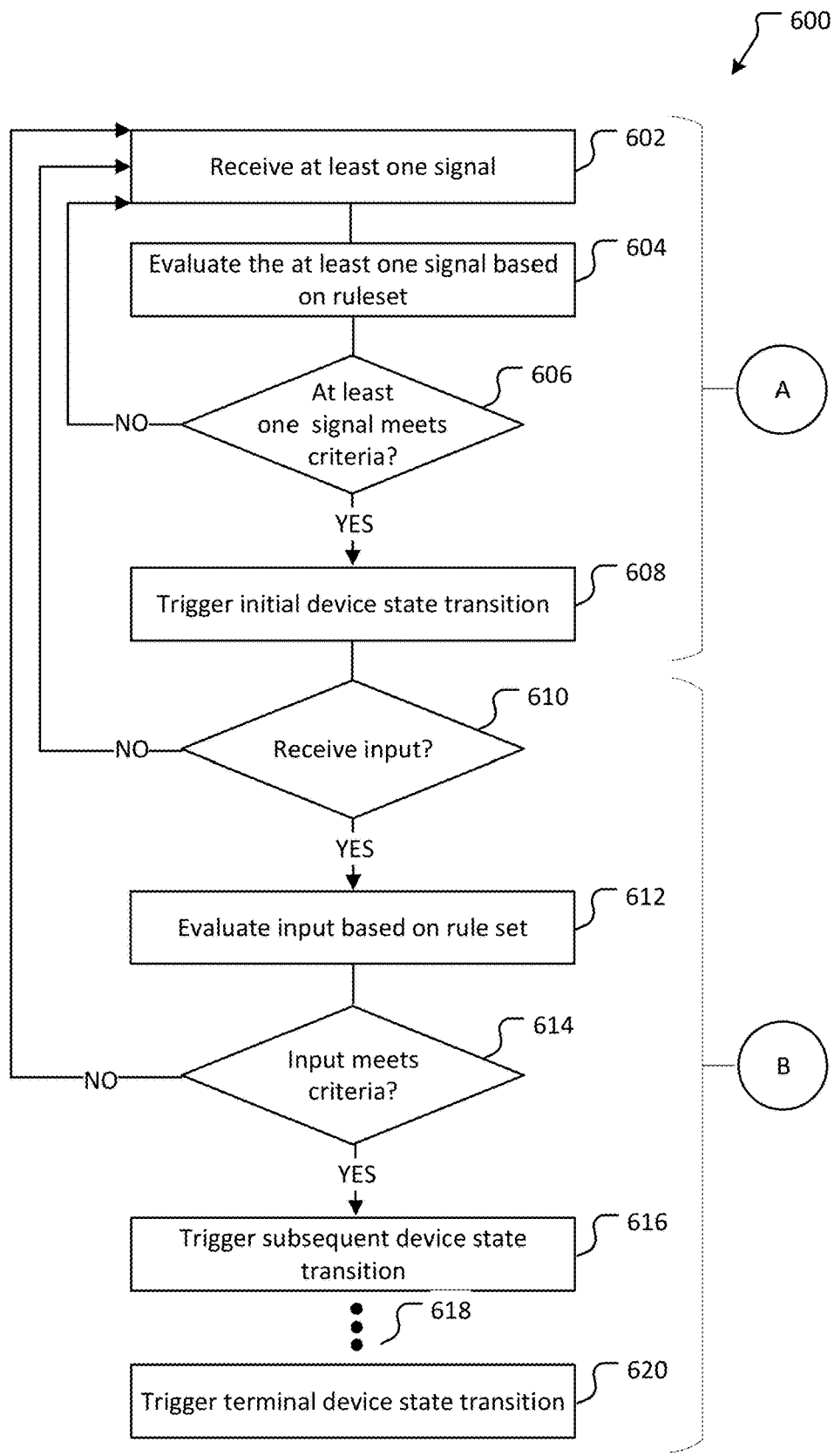
FIG. 6 illustrates an example method for triggering a contextual workflow on a handheld device in accordance with aspects of the present disclosure.

FIG. 6 illustrates an example method for triggering a contextual workflow on a handheld device in accordance with aspects of the present disclosure.

A general order of the operations for the method 600 is shown in FIG. 6. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1-5B, and 7-11B.

At receive signal operation 602, at least one signal may be received from one or more sensors associated with a handheld device (e.g., handheld device 104). For instance, sensors may include one or more of: a touch sensor (e.g., resistive, capacitive, acoustic wave, infrared touch sensors) for detecting touch input; a gyroscope for detecting velocity or rotation of device orientation; an accelerometer for detecting a spatial orientation of a device; a proximity (or light) sensor for detecting a user proximity to a device; a microphone for capturing audio input; a camera for capturing image or video input and for detecting a visual field of a device; an angular position sensor (e.g., located at a device hinge) for detecting an angle between screens or between a screen and another device component, an accessory, or a user anatomy (e.g., laptop keyboard, device cover, removable tablet keyboard, user hand, and the like); and the like. As should be appreciated, this list of sensors is not exhaustive and should not be understood as limiting; moreover, any number or combination of sensors is contemplated for use by the systems and methods described herein. As should be further appreciated, different handheld devices may support different sensors or sensor configurations. In aspects, the at least one signal may be processed to detect values (e.g., an angle, a camera visual field), device positional changes (e.g., changes in orientation, rotation), device interactions (e.g., user proximity, touch input, audio input), and the like.

At evaluate signal operation 604, the received at least one signal may be evaluated based on a ruleset for triggering a workflow. As detailed above, a ruleset for triggering a workflow may specify one or more rules for evaluating signals to trigger device state transitions associated with the workflow. For example, rules may be directed to an order or sequence of device state transitions, a signal (or combination of signals) for triggering each state transition, a sequence and timing of signals for triggering each state transition, criteria for evaluating the signal or combination of signals (e.g., threshold values and/or ranges of values) to determine whether and/or when to trigger, and the like. Additionally, context and/or device parameters may be evaluated when applying the ruleset to the at least one signal. For instance, context including frequently used applications may enable a handheld device to determine an appropriate application to open (e.g., preferred task application) in response to triggering a device state transition of a workflow. In other aspects, device parameters (e.g., supported sensors) may enable the handheld device to assess signal quality when applying the ruleset.

At determination operation 606, it may be determined whether the at least one signal meets criteria for triggering a workflow based on the ruleset. If the at least one signal meets the criteria, the method may progress to trigger operation 610. If the at least one signal does not meet the criteria, the method may return to receive signal operation 602.

At trigger operation 608, an initial device state transition of a workflow may be triggered based on determining that the at least one signal met the criteria of the ruleset. For example, in response to determining that a workflow should be triggered, the operating system of the handheld device may trigger the initial device state transition associated with the workflow. Triggering the initial device state transition may involve performing one or more actions, including operations such as "light up screen," "open," "capture," "save," "connect," "disconnect," "project," "wait for input," and the like. In aspects, the initial device state transition may provide an output associated with the workflow based on performing an action. Regarding the example above, the at least one signal may indicate that the screens of a dual-screen device have been positioned at an angle of about 15 degrees and the user's face is in proximity to at least one screen. Upon evaluating the at least one signal based on the ruleset, it may be determined that a workflow for capturing a quick thought should be triggered and, in particular, an initial device state transition for lighting up a microphone to listen for audio input should be triggered. Here, the initial device state transition may provide a first output associated with the workflow (e.g., detecting and capturing the audio input).

At determination operation 610, subsequent to triggering the workflow, it may be determined whether additional signals (e.g., input) have been received within a time period. As noted above, input is the result of processing signal data associated with a device interaction (e.g., user interaction) received or captured by a device sensor (e.g., touch sensor, microphone, camera, etc.). For instance, in the example above, when the workflow for capturing a quick thought is triggered, an initial device state transition for lighting up a microphone to listen for audio input may also be triggered. If audio input is not received within a period of time (e.g., as defined by the ruleset), the workflow may be terminated and the handheld device may return to monitoring sensors. Thus, if input is received within the time period, the method may progress to evaluate input operation 612. If input is not received within the time period, the method may return to receive signal operation 602. In aspects, rather than input, determination operation 610 may consider whether a different type of signal (e.g., device orientation) has been received within a time period.

At evaluate input operation 612, received input may be evaluated based on the ruleset associated with the workflow. For instance, if a device state transition for lighting up a microphone to listen for audio input was triggered as part of the workflow, receiving audio input may satisfy the ruleset and a subsequent device state transition may be triggered. In contrast, if touch input rather than audio input is received, the touch input may not satisfy the ruleset and the workflow may be terminated.

At determination operation 614, if the received input meets the criteria of the ruleset associated with the triggered workflow, the method may progress to trigger operation 618. If the received input does not meet the criteria of the ruleset, the method may return to receive signal operation 602.

At trigger operation 616, a subsequent device state transition of the workflow may be triggered based on determining that the input meets the criteria of the ruleset. For instance, based on the example above, when the audio input meets the criteria of a ruleset associated with a workflow for capturing quick thought, a subsequent device state transition for translating the audio input into text may be triggered. In aspects, the subsequent device state transition may provide an output associated with the workflow (e.g., a text translation of the audio input).

As noted above, a workflow may comprise a series of device state transitions associated with executing the workflow. Each device state transition of the series may be triggered based on receiving and evaluating subsequent signals. As indicated by ellipses 618, the method may continue to receive signals, evaluate signals, and trigger device state transitions until it is determined that the outputs associated with the series of device state transitions provide the user experience associated with the workflow. Thereafter, the workflow may be terminated by triggering a terminal device state transition at trigger terminal operation 620.

Figure 7:
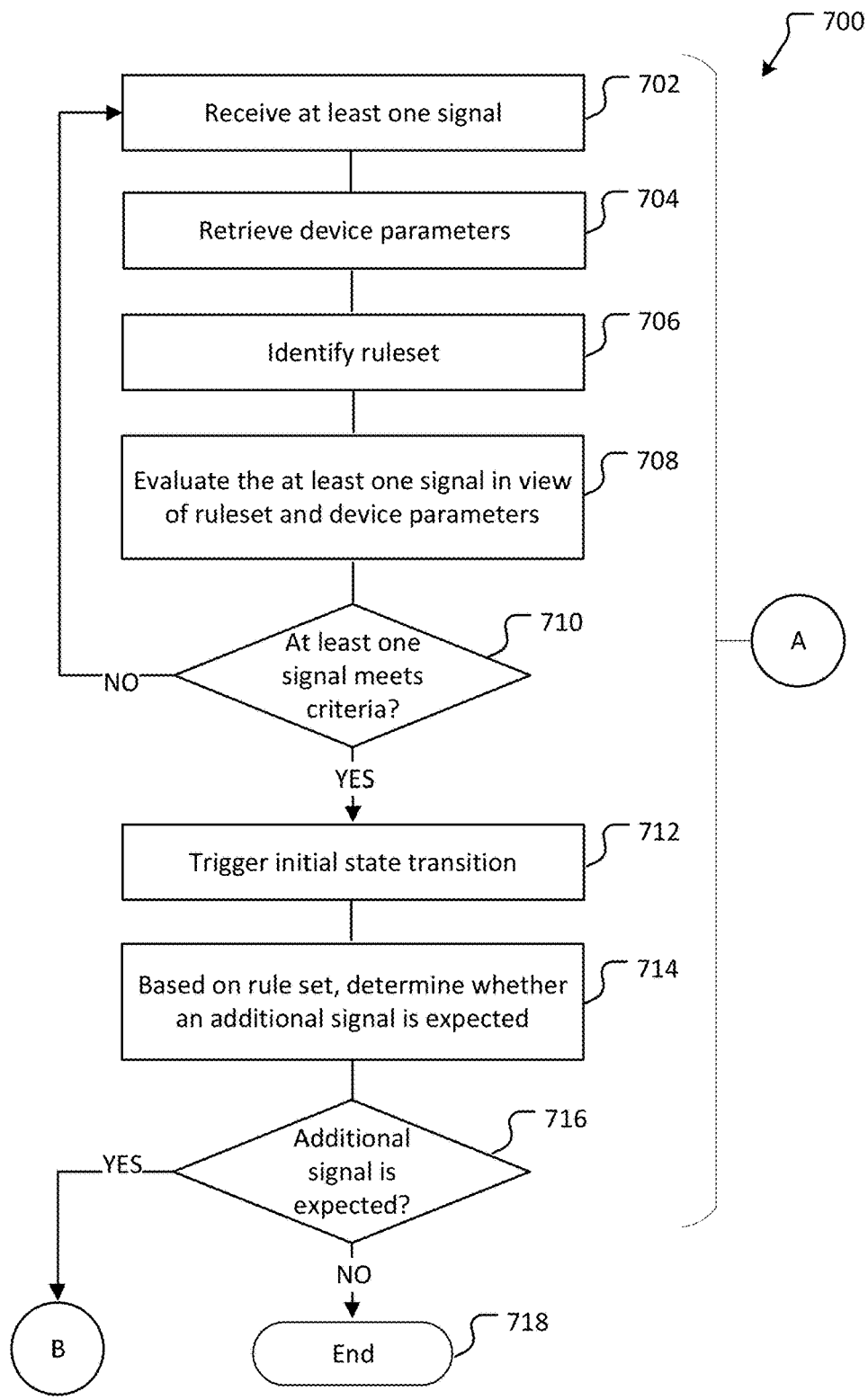
FIG. 7 illustrates an example method of triggering an initial device state transition of a contextual workflow on a device in accordance with aspects of the present disclosure.
Figure 8:
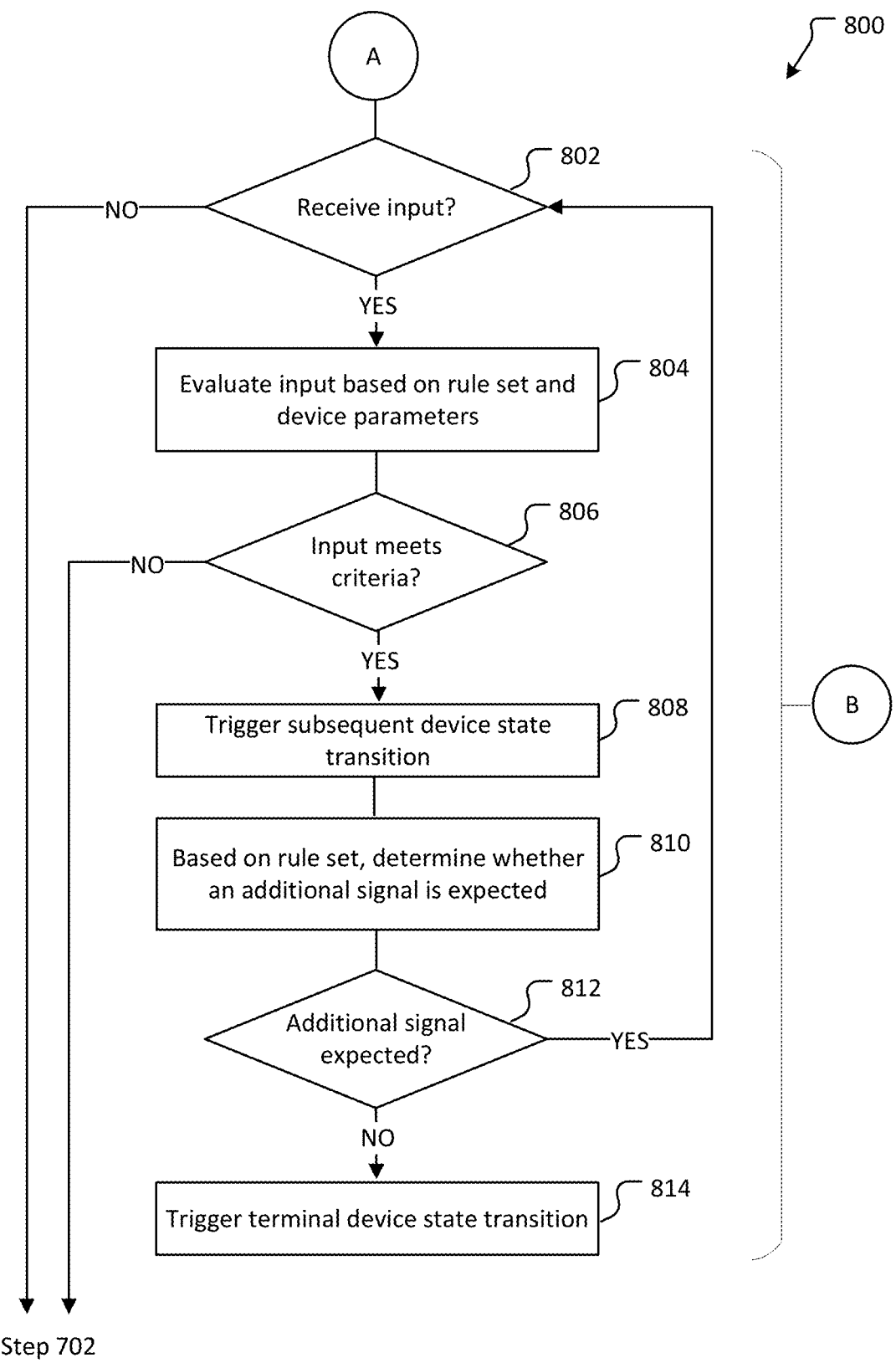
FIG. 8 illustrates an example method of triggering a subsequent state transition of a contextual workflow on a device in accordance with aspects of the present disclosure.

In aspects, operations 602-608 are detailed further with respect to FIG. 7 (as indicated by "A") and operations 610-620 are detailed further with respect to FIG. 8 (as indicated by "B").

As should be appreciated, operations 602-620 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 7 illustrates an example method of triggering an initial device state transition of a contextual workflow on a device in accordance with aspects of the present disclosure.

A general order of the operations for the method 700 is shown in FIG. 7. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, an ASIC, an FPGA, a SOC or other hardware device. Hereinafter, the method 700 shall be explained with reference to the systems, components, devices, modules, software, data structures, data characteristic representations, signaling diagrams, methods, etc., described in conjunction with FIGS. 1-6, and 8-11B.

At receive signal operation 702, similar to receive signal operation 602, at least one signal may be received from one or more sensors associated with a handheld device (e.g., handheld device 104). In aspects, the at least one signal may be processed to detect values (e.g., an angle, a camera visual field), device positional changes (e.g., changes in orientation, rotation), device interactions (e.g., user proximity, touch input, audio input), and the like.

At retrieve parameters operation 704, device parameters may be retrieved for the handheld device. Device-specific parameters may include supported sensors, device usage data (e.g., how users commonly hold or interact with the device), device settings, device form factor (e.g., size, shape, style, layout and position of device components, etc.), and the like.

At identify ruleset 706, it may be determined whether a ruleset is relevant to the at least one signal. As noted above, a plurality of workflows may be created for providing a plurality of different user experiences. However, different workflows may be triggered by different signals based on the ruleset associated with each workflow. Thus, when a particular signal is received (e.g., indicating that a dual-screen device has been opened such that the screens are oriented at about a 15-degree angle), a ruleset for evaluating the particular signal may be identified from a plurality of rulesets.

At evaluate signal operation 708, the received at least one signal may be evaluated based on the identified ruleset. The identified ruleset may specify one or more rules for evaluating the at least one signal to trigger device state transitions associated with a workflow. Additionally, the retrieved device parameters may be evaluated when applying the identified ruleset to the at least one signal. For instance, the retrieved device parameters (e.g., supported sensors) may enable the handheld device to assess signal quality when applying the ruleset.

At determination operation 710, it may be determined whether the at least one signal meets criteria for triggering a workflow based on the identified ruleset. If the at least one signal meets the criteria, the method may progress to trigger operation 712. If the at least one signal does not meet the criteria, the method may return to receive signal operation 702.

At trigger operation 712, an initial device state transition of a workflow may be triggered based on determining that the at least one signal met the criteria of the identified ruleset. For example, in response to determining that a workflow should be triggered, the operating system of the handheld device may trigger the initial device state transition associated with the workflow. Triggering the initial device state transition may involve performing one or more actions, including operations such as "light up screen," "open," "capture," "save," "connect," "disconnect," "project," "wait for input," and the like. For instance, based on the example above, the at least one signal may indicate that the screens of a dual-screen device have been positioned at an angle of about 15 degrees and the user's face is in proximity to at least one screen. Upon evaluating the at least one signal based on the identified ruleset, it may be determined that a workflow for capturing a quick thought should be triggered and, in particular, an initial device state transition for lighting up a microphone to listen for audio input should be triggered.

At determination operation 714, subsequent to triggering the initial device state transition, it may be determined whether an additional signal (or input) is expected within a time period. As noted above, input is the result of processing signal data associated with a device interaction (e.g., user interaction) received or captured by a device sensor (e.g., touch sensor, microphone, camera, etc.). For instance, in the example above, when the workflow for capturing a quick thought is triggered, an initial device state transition for lighting up a microphone to listen for audio input may also be triggered. In this case, at least one additional signal (e.g., audio input detected and captured by the microphone) is expected in order to continue executing the workflow.

At determination operation 716, if an additional signal is expected, the method may progress to receive input operation 802 of method 800. If an additional signal is not expected, the method may terminate at end operation 718. In some aspects, end operation 718 may involve triggering a terminal device state transition for the workflow.

As should be appreciated, operations 702-718 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

FIG. 8 illustrates an example method of triggering a subsequent device state transition of a contextual workflow on a device in accordance with aspects of the present disclosure.

A general order of the operations for the method 800 is shown in FIG. 8. The method 800 may follow the method 700. The method 800 may include more or fewer steps or may arrange the order of the steps differently than those shown in FIG. 8. The method 800 can be executed as a set of computer-executable instructions executed by a computer system and encoded or stored on a computer readable medium. Further, the method 800 can be performed by gates or circuits associated with a processor, an ASIC, an FPGA, a SOC or other hardware device. Hereinafter, the method 800 shall be explained with reference to the systems, components, devices, modules, software, data structures, data characteristic representations, signaling diagrams, methods, etc., described in conjunction with FIGS. 1-7, and 9-11B.

At determination operation 802, subsequent to triggering the workflow, it may be determined whether additional signals (e.g., input) have been received within a time period. As noted above, input is the result of processing signal data associated with a device interaction (e.g., user interaction) received or captured by a device sensor (e.g., touch sensor, microphone, camera, etc.). For instance, in the example above, when the workflow for capturing a quick thought is triggered, an initial device state transition for lighting up a microphone to listen for audio input may also be triggered. If audio input is not received within a period of time (e.g., as defined by the ruleset), the workflow may be terminated and the handheld device may return to monitoring sensors. Thus, if input is received within the time period, the method may progress to evaluate input operation 804. If input is not received within the time period, the method may return to receive signal operation 702 of method 700. In aspects, rather than input, determination operation 610 may consider whether a different type of signal (e.g., device orientation) has been received within a time period.

At evaluate input operation 804, received input may be evaluated based on the identified ruleset associated with the workflow. For instance, if a device state transition for lighting up a microphone to listen for audio input was triggered as part of the workflow, receiving audio input may satisfy the ruleset and a subsequent device state transition may be triggered. In contrast, if touch input rather than audio input is received, the touch input may not satisfy the ruleset and the workflow may be terminated.

At determination operation 806, if the received input meets the criteria of the identified ruleset associated with the triggered workflow, the method may progress to trigger operation 808. If the received input does not meet the criteria of the ruleset, the method may return to receive signal operation 702 of method 700.

At trigger operation 808, a subsequent device state transition of the workflow may be triggered based on determining that the input meets the criteria of the identified ruleset. For instance, based on the example above, when the audio input meets the criteria of a ruleset associated with the workflow for capturing quick thought, a subsequent device state transition for translating the audio input into text may be triggered.

At determination operation 810, after triggering the subsequent device state transition, it may be determined whether an additional signal (or input) is expected within a time period. As noted above, input is the result of processing signal data associated with a device interaction (e.g., user interaction) received or captured by a device sensor (e.g., touch sensor, microphone, camera, etc.). In the example above, when the audio input meets the criteria, the subsequent device state transition for translating the audio input to text may be triggered. In this case, an additional signal that is the output of an application (e.g., speech-to-text translation application) is expected in order to continue executing the workflow.

At determination operation 812, if an additional signal is expected, the method may return to receive input operation 802. If an additional signal is not expected, the method may progress to trigger terminal operation 814.

At trigger terminal operation 814, a terminal device state transition may be triggered and the workflow may be terminated.

As should be appreciated, operations 802-814 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 9:
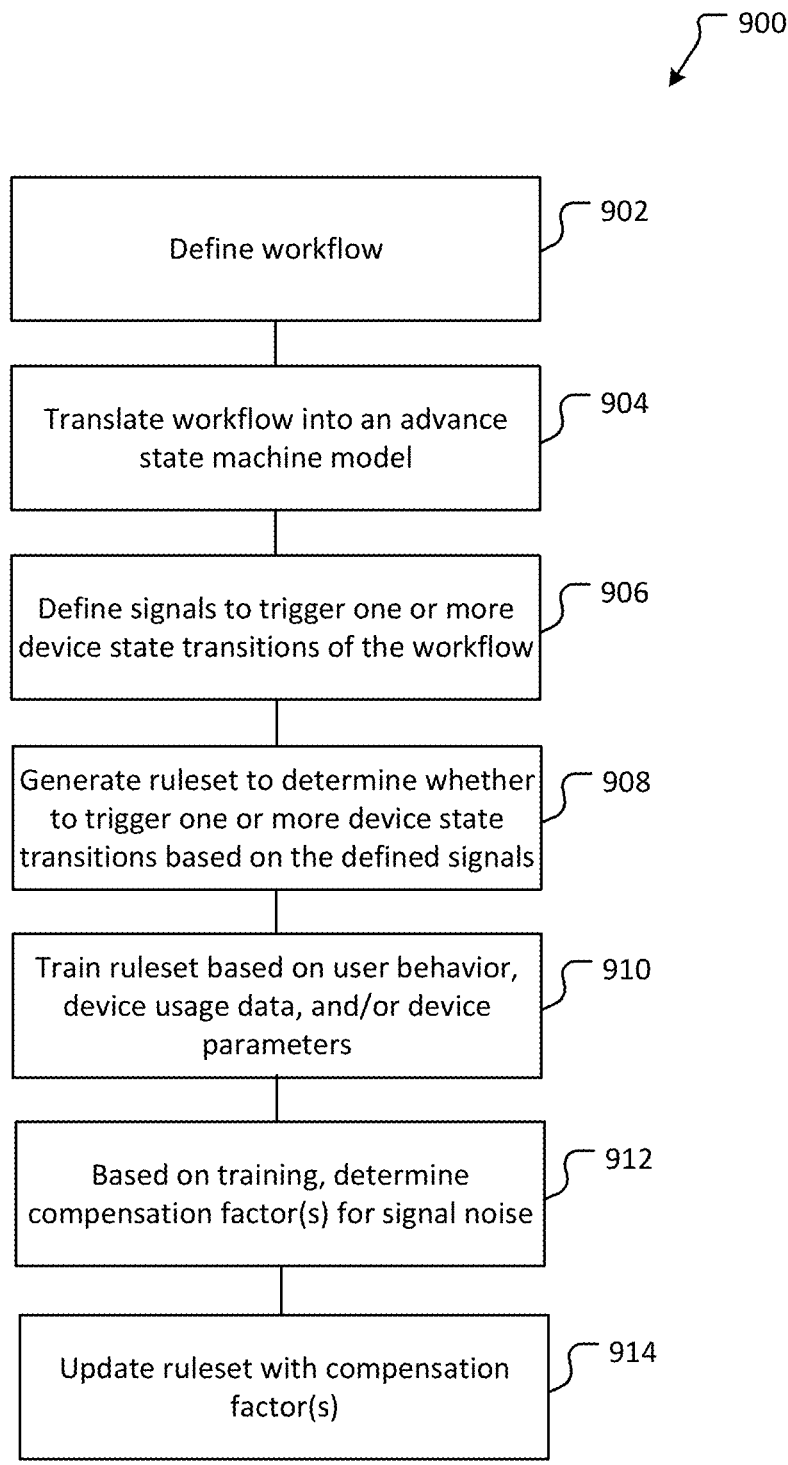
FIG. 9 illustrates an example method of defining a contextual workflow for a device in accordance with aspects of the present disclosure.

FIG. 9 illustrates an example method of creating a contextual workflow for execution on a device in accordance with aspects of the present disclosure.

A general order of the operations for the method 900 is shown in FIG. 9. The method 900 may include more or fewer steps or may arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, an ASIC, an FPGA, a SOC or other hardware device. Hereinafter, the method 900 shall be explained with reference to the systems, components, devices, modules, software, data structures, data characteristic representations, signaling diagrams, methods, etc., described in conjunction with FIGS. 1-8, and 10-11B.

At define workflow operation 902, a workflow may be defined. For instance, by analyzing user behavior and/or device characteristics, workflows for providing various user experiences may be identified and defined. For example, it may be determined that the unique attributes of dual-screen devices offer users the natural ability to capture quick thoughts by performing intuitive motions such as minimally opening the device, speaking (or whispering) a short input into the private space between the screens, and then closing the device when finished. A workflow for implementing the above scenario may be defined as a series of actions, such as detecting device screens spreading to a minimal angle, detecting input, capturing input, retrieving context, analyzing the input (and the context), determining and opening an appropriate application and/or application component, adding the input to the appropriate application or application component, saving the input, and generating a notification of successful completion.

At translate operation 904, the workflow may be translated into an advance state model. For instance, the workflow may be translated into a series of device state transitions for executing the workflow, where each device state transition is triggered by one or more signals to implement the workflow. The output(s) of the workflow (or the device state transitions), e.g., the user experience, may be the result of performing one or more "actions," including operations such as "light up," "open," "capture," "save," "connect," "disconnect," "project," "wait for input," and the like.

At define signal operation 906, one or more signals for triggering device state transitions may be defined based on user behavior and/or device parameters. For instance, to implement the workflow for capturing a short note or reminder, one or more signals may be defined that are indicative of a device being minimally opened, e.g., a signal directed to a minimal angle between the dual screens, and/or the user is in proximity to at least one screen of the device, e.g., a signal directed to detecting a distance between the user's face and at least one screen. Such signals are indicative of a user's intention to capture a quick note and may be used to trigger a workflow for implementing the user's intention.

At generate operation 908, a ruleset may be generated for triggering the workflow based on evaluating one or more of the defined signals. That is, a ruleset may be created that specifies one or more rules for evaluating the defined signals to determine whether and when to trigger a series of device state transitions associated with the workflow. For example, rules may be directed to an order or sequence of device state transitions, a signal (or combination of signals) for triggering each device state transition, a sequence and timing of signals for triggering each state transition, criteria for evaluating the signal or combination of signals (e.g., threshold values and/or ranges of values), and the like. As should be understood, the ruleset for each defined workflow is extensible, to allow for different signals or combinations of signals to trigger a particular device state transition (e.g., for devices with a different set of supported sensors), or to allow the same signals or combinations of signals to trigger different device state transitions on different devices or in different contexts.

At train operation 910, the model may be trained based on training data associated with user behavior, device usage data, and/or device parameters. For instance, the training data may evidence variations in user behavior (e.g., left-handed versus right-handed users may pick up, open, and hold handheld devices slightly differently); variations across different devices, such as different sets of supported sensors, different usage data (e.g., users may hold or interact with different devices in different ways), device form factor (e.g., size, shape, style, layout and position of device components, etc.); and the like. That is, the training data may indicate that users pick up and open handheld devices slightly differently, which may influence the criteria for evaluating signals, e.g., for detection of upright orientation, detection of an angle at which a device is minimally opened, detection of proximity between a user and a device, and the like. As should be appreciated, variations in user behavior and/or device parameters can result in variations in signal quality, which can result in inconsistent application of a ruleset when evaluating the signals.

At compensation operation 912, based on the training, noise compensation factors that account for variations in user behavior, device parameters, and the like, can be determined. The noise compensation factors can then be used to tune rulesets for more consistent application across different scenarios.

At update operation 914, the ruleset may be updated. For instance, the ruleset may be updated with the noise compensation factors to improve the criteria (e.g., ranges of values, updated thresholds) for evaluating signals. As should be appreciated, the ruleset may be continually trained and updated to account for new devices, new sensor configurations, evolving user behavior, and the like. In further aspects, the updated rulesets may be made available to handheld devices such that the evaluation of signals for triggering workflows may be continually tuned and improved.

As should be appreciated, operations 902-914 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 10:
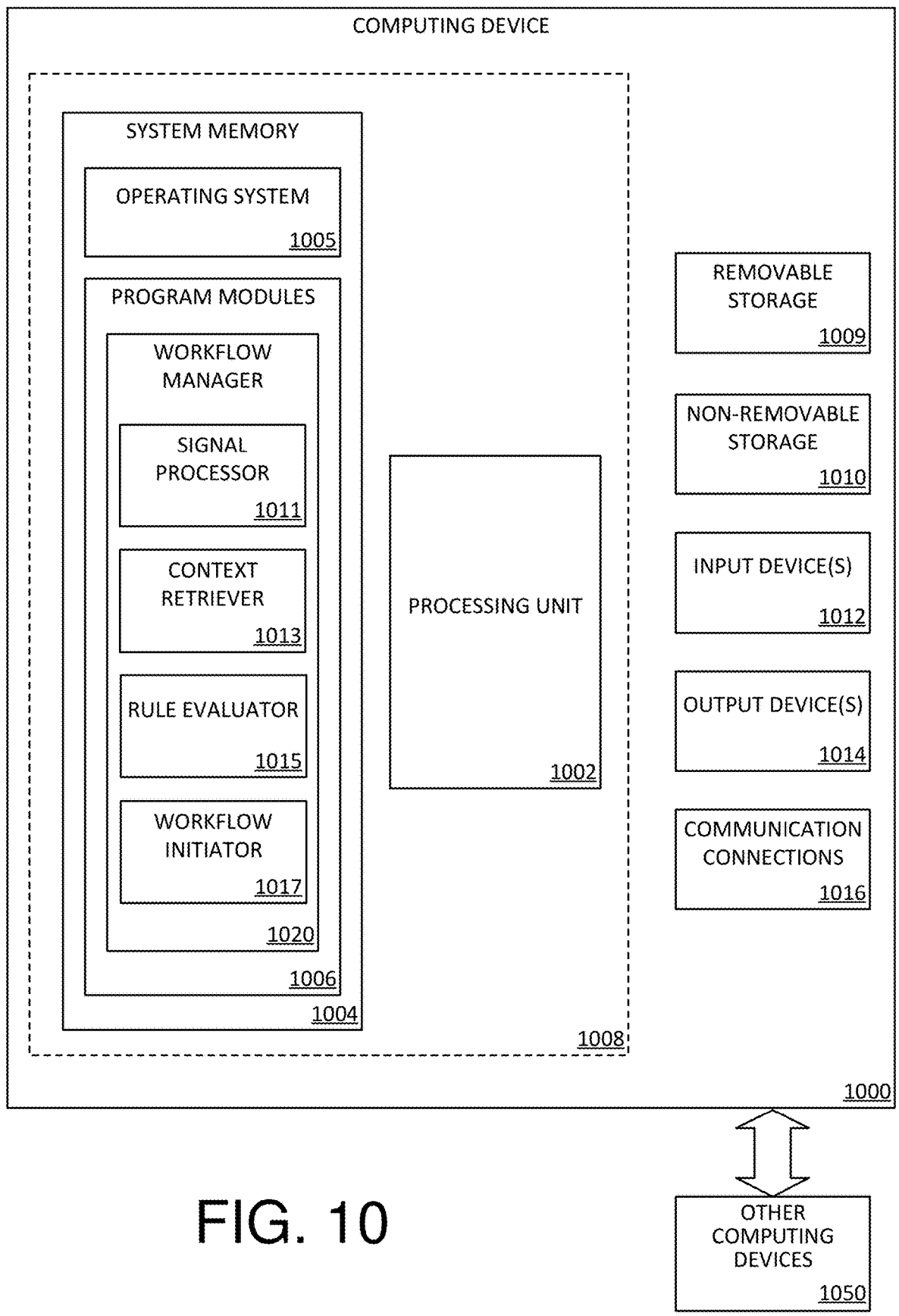
FIG. 10 is a block diagram illustrating physical components (e.g., hardware) of a computing device with which aspects of the disclosure may be practiced.

FIG. 10 is a block diagram illustrating physical components (e.g., hardware) of a computing device 1000 with which aspects of the disclosure may be practiced. The computing device components described below may have computer executable instructions for implementing a workflow manager 1020 on a computing device (e.g., multi-screen device 104), including computer executable instructions for workflow manager 1020 that can be executed to implement the methods disclosed herein. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running workflow manager 1020, such as one or more components with reference to FIG. 1 and, in particular, signal processor 1011 (e.g., corresponding to signal processor 110), context retriever 1013 (e.g., corresponding to context retriever 112 and parameter retriever 114), rule evaluator 1015 (e.g., corresponding to rule evaluator 116), and/or workflow initiator 1017 (e.g., corresponding to workflow initiator 118).

The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., workflow manager 1020) may perform processes including, but not limited to, the aspects as described herein. Other program modules that may be used in accordance with aspects of the present disclosure, and in particular for defining a gesture, may include signal processor 1011, context retriever 1013, rule evaluator 1015, and/or workflow initiator 1017, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The computing device 1000 may further support a number of sensors for detecting input associated with the input device(s) 1012 and/or other device conditions. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
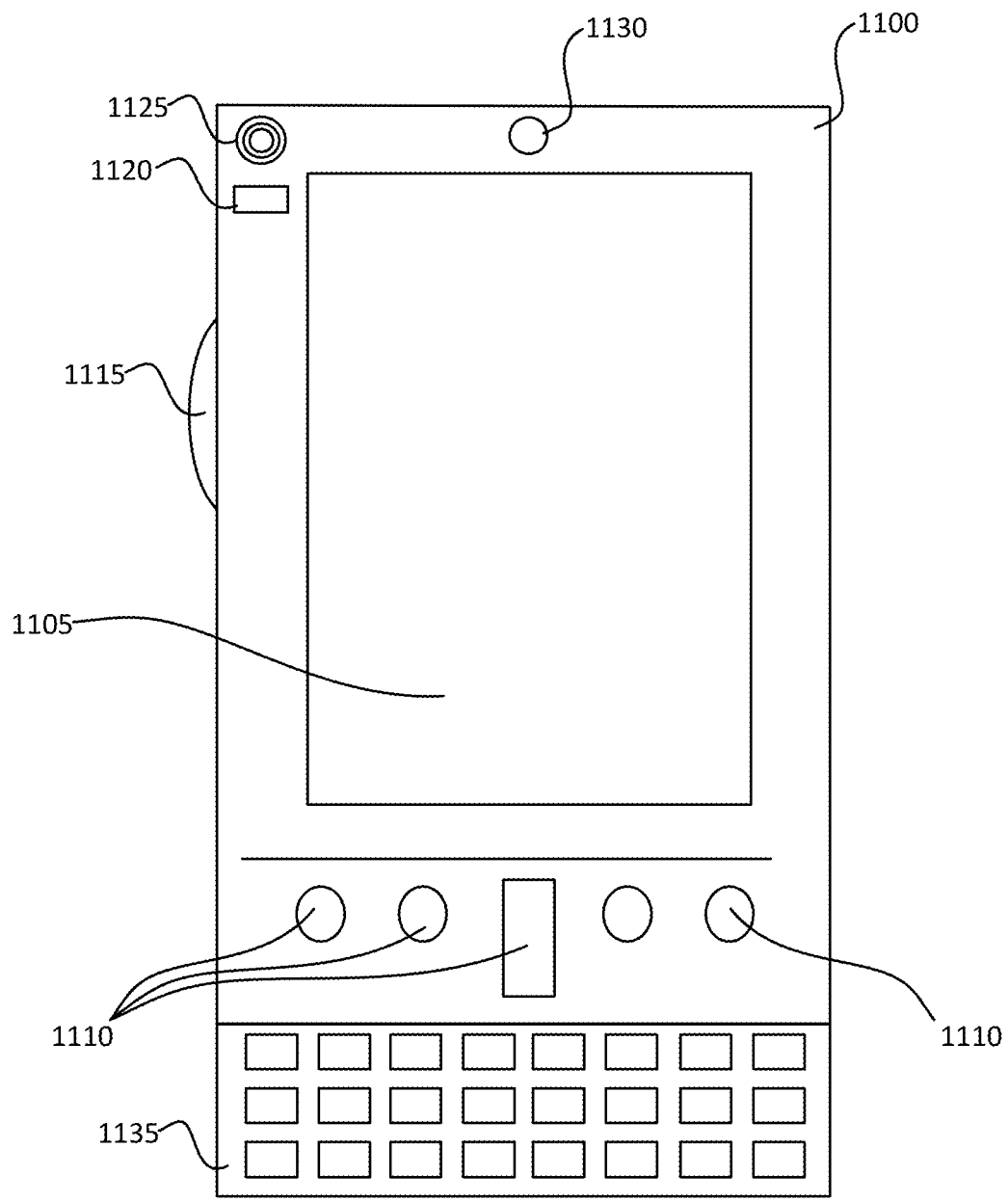
FIG. 11A is a simplified diagram of a mobile computing device with which aspects of the present disclosure may be practiced.
Figure 11B:
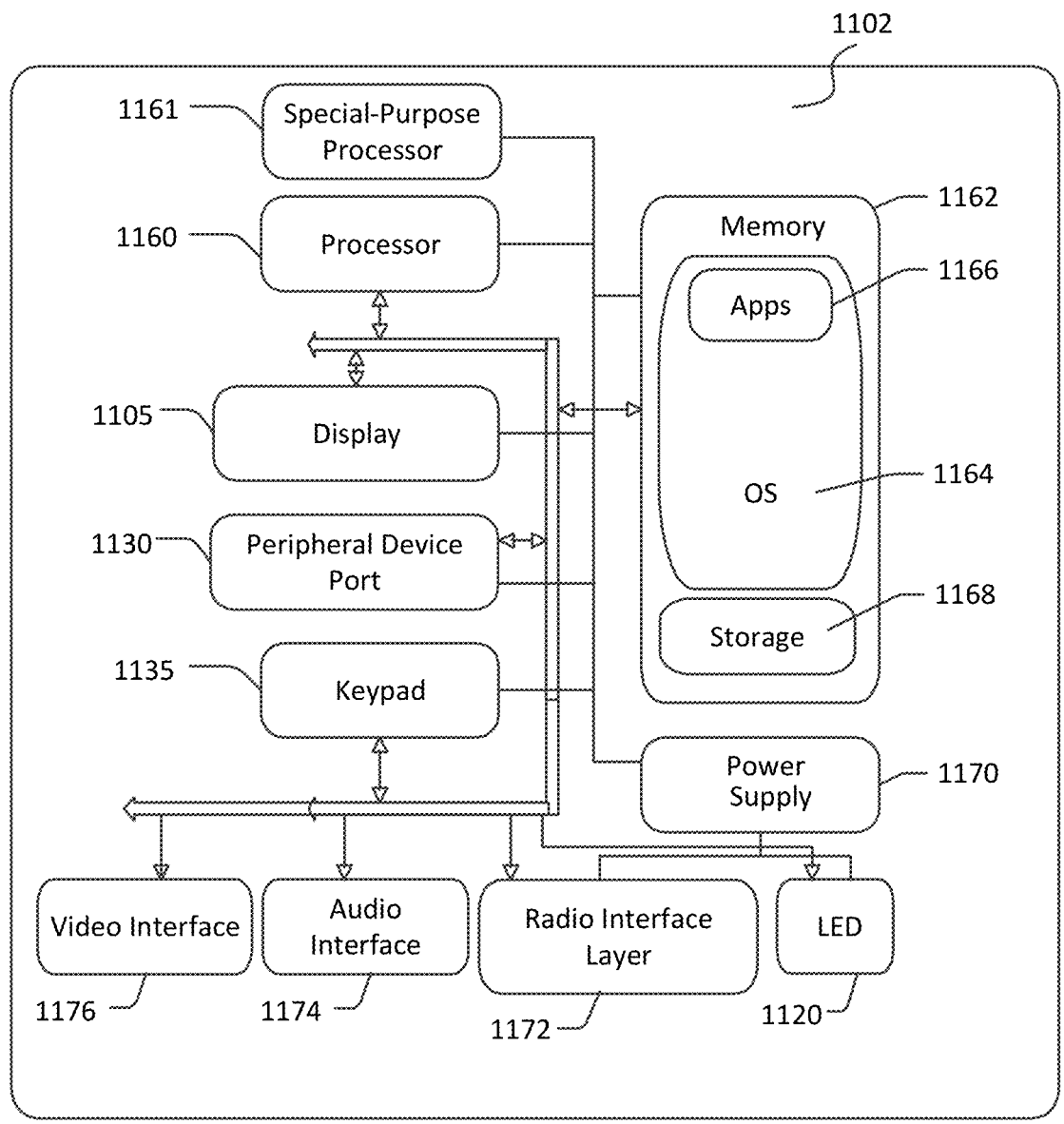
FIG. 11B is another simplified block diagram of a mobile computing device with which aspects of the present disclosure may be practiced.

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for providing a workflow manager as described herein.

The system 1102 has a power supply 1170, which may be implemented as one or more batteries. The power supply 1170 may further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer 1125 (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera) to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/ information transfer and storage means, including electronic mail and collaborative data/information sharing systems.

As should be appreciated, FIGS. 11A and 11B are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A computer-implemented method for triggering at least one workflow on a multi-screen portable device, the method comprising:
   receiving at least a first signal on the multi-screen portable device, wherein the first signal is indicative of an output of a device sensor, an output of an application, an output of processing, and a stationary angle of between ten degrees and one hundred and seventy degrees between screens of the multi-screen portable device;
   evaluating the first signal based on a ruleset wherein the ruleset is evaluated to determine whether the first signal meets criteria comprising threshold values and/or range of values for triggering a first workflow having a sequence of user input functions associated with a series of user indicated actions to be automatically performed on the multi-screen portable device when a user input is received at the stationary angle, wherein the ruleset specifies a sequence of triggering device state transitions for causing each action of the series of actions;
   in response to the first signal and based on the evaluation, automatically triggering at least two device state transitions according to the sequence, the at least two device state transitions comprising a first device state transition causing a first action of the series of actions and a second device state transition causing a second action of the series of actions;
   receiving at least a second signal while the multi-screen portable device is at the stationary angle, wherein the second signal is a user input to the multi-screen portable device;
   evaluating the second signal based on the ruleset and based on the evaluation of the second signal, automatically triggering a second workflow, wherein the second workflow is different from the first workflow;
   in response to the second signal based on the evaluation, automatically triggering a third device state transition according to the sequence, wherein the third device state transition causes at least a third action of the series of actions associated with the first workflow;
   determining that the first action, the second action, and the third action implement the first workflow; and
   terminating the first workflow.

2. The computer-implemented method of claim 1, wherein the ruleset comprises criteria for evaluating at least the first signal and the second signal.

3. The computer-implemented method of claim 2, wherein the criteria is determined based on evaluating data associated with at least one of user behavior or parameters associated with the multi-screen portable device.

4. The computer-implemented method of claim 1, wherein the second workflow is automatically triggered prior to terminating the first workflow.

5. The computer-implemented method of claim 1, further comprising:
   translating the second signal from speech to text; and
   evaluating content of the second signal.

6. The computer-implemented method of claim 1, wherein the first signal is indicative of about a 15-degree stationary angle between screens of the multi-screen portable device.

7. The computer-implemented method of claim 6, wherein the multi-screen portable device is a dual-screen device, and wherein about the 15-degree stationary angle is between a first screen and a second screen of the dual-screen device.

8. A multi-screen portable device, comprising:
   at least one processor; and
   at least one memory storing computer-executable instructions that when executed by the at least one processor cause the multi-screen portable device to perform operations, comprising:
   receive a first signal, wherein the first signal is indicative of an output of a device sensor, an output of an application, an output of processing, and a stationary angle of between ten degrees and one hundred and seventy degrees between screens of the multi-screen portable device;
   evaluate the first signal based on a ruleset wherein the ruleset is evaluated to determine whether the first signal meets criteria comprising threshold values and/or range of values for triggering a workflow having a sequence of user input functions associated with a series of actions to be automatically performed on the multi-screen portable device when a user input is received at the stationary angle, wherein the ruleset specifies a sequence of triggering device state transitions for causing each action of the series of actions;
   in response to the first signal and based on the evaluation, automatically trigger at least two device state transitions according to the sequence, the at least two device state transitions comprising a first device state transition causing a first action of the series of actions and a second device state transition causing a second action of the series of actions;
   receive at least a second signal while the multi-screen portable device is at the stationary angle, wherein the second signal is a user input;
   evaluate at least the second signal based on the ruleset and based on the evaluation of the second signal, automatically triggering a second workflow, wherein the second workflow is different from the first workflow;
   in response to the second signal based on the evaluation, automatically trigger a third device state transition according to the sequence, wherein the third device state transition causes a third action of the series of actions associated with the workflow; and determine that the first action, the second action, and the third action implement the workflow.

9. The multi-screen portable device of claim 8, wherein the ruleset comprises criteria for evaluating at least the first signal and the second signal.

10. The multi-screen portable device of claim 9, wherein the criteria is determined based on evaluating data associated with at least one of user behavior or parameters associated with the multi-screen portable device.

11. The multi-screen portable device of claim 8, the instructions when executed further causing the multi-screen portable device to:
evaluate content of the user input; and
automatically store the user input in an application installed on the multi-screen portable device.

12. The multi-screen portable device of claim 8, wherein the first signal is based on interpreting signals from at least two sensors using a machine learning model.

13. The multi-screen portable device of claim 8, wherein the first signal is indicative of about a 15-degree stationary angle between screens of the multi-screen portable device.

14. The multi-screen portable device of claim 13, wherein the multi-screen portable device is a dual-screen device, and wherein about the 15-degree stationary angle is between a first screen and a second screen of the dual-screen device.

15. A computer storage medium storing computer-executable instructions that when executed by a processor cause a computer system to perform operations, comprising:
define a workflow having a sequence of user input functions associated with a series of actions on a multi-screen portable device;
translate the workflow into an advance state machine model, wherein the advance state machine model comprises a sequence of device state transitions for implementing the workflow, and wherein each device state transition provides an action of the series of actions;
define one or more signals for triggering the sequence of device state transitions to implement the workflow, wherein at least one defined signal is indicative of at least one of: an orientation of the multi-screen portable device, a position of the multi-screen portable device, a device state of the multi-screen portable device, an output of a device sensor, an output of an application, an output of processing, or a stationary angle of between ten degrees and one hundred and seventy degrees between screens of the multi-screen portable device, and wherein the at least one defined signal automatically triggers at least two device state transitions according to the sequence;
generate a ruleset for evaluating the one or more defined signals wherein the ruleset is evaluated to determine whether the one or more signals meet criteria comprising threshold values and/or range of values for triggering the sequence of device state transitions in response to at least one received signal; and
train the ruleset based on at least one of usage data or device parameters.

16. The computer storage medium of claim 15, the instructions when executed causing the computer system to perform further operations, comprising:
determine compensation factors to compensate for signal noise based on the training.

17. The computer storage medium of claim 16, the instructions when executed further causing the computer system to perform further operations, comprising:
update the ruleset with the compensation factors.

18. The computer storage medium of claim 17, wherein the task is associated with automatically performing series of actions in response to determining a user intention.

19. The computer-implemented method of claim 1, wherein the first workflow comprises voice commands.

20. The computer-implemented method of claim 1, further comprising a fingerprint sensor that detects double tapping while the multi-screen portable device is at the stationary angle.

* * * * *